US008773509B2

(12) United States Patent
Pan

(10) Patent No.: US 8,773,509 B2
(45) Date of Patent: Jul. 8, 2014

(54) IMAGING DEVICE, IMAGING METHOD AND RECORDING MEDIUM FOR ADJUSTING IMAGING CONDITIONS OF OPTICAL SYSTEMS BASED ON VIEWPOINT IMAGES

(75) Inventor: Yi Pan, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 523 days.

(21) Appl. No.: 12/838,074

(22) Filed: Jul. 16, 2010

(65) Prior Publication Data

US 2011/0012998 A1 Jan. 20, 2011

(30) Foreign Application Priority Data

Jul. 17, 2009 (JP) ................................. 2009-169317
Mar. 26, 2010 (JP) ................................. 2010-072997

(51) Int. Cl.
*H04N 13/02* (2006.01)

(52) U.S. Cl.
USPC ......................................................... 348/47

(58) Field of Classification Search
CPC .............. H04N 13/02; H04N 5/23212; H04N 13/0018; H04N 13/0025; H04N 13/0246
USPC .......................................................... 348/47
IPC ...................................................... H04N 13/02
See application file for complete search history.

(56) References Cited

U.S. PATENT DOCUMENTS

| 5,903,303 | A | 5/1999 | Fukushima et al. | |
|---|---|---|---|---|
| 6,031,538 | A | 2/2000 | Chupeau et al. | |
| 6,987,534 | B1 | 1/2006 | Seta | |
| 2008/0122940 | A1* | 5/2008 | Mori .......................... | 348/222.1 |
| 2009/0135291 | A1 | 5/2009 | Sugimoto | |
| 2009/0160931 | A1 | 6/2009 | Pockett et al. | |

FOREIGN PATENT DOCUMENTS

| JP | 5-134167 | A | | 5/1993 |
|---|---|---|---|---|
| JP | 8-194274 | A | | 7/1996 |
| JP | 08317429 | A | * | 11/1996 |
| JP | 9-61910 | A | | 3/1997 |
| JP | 2001-069402 | A | | 3/2001 |

(Continued)

OTHER PUBLICATIONS

Japanese Office Action issued on Oct. 23, 2013 in corresponding Application No. 2010-072997.
Chinese Office Action for Chinese Application No. 201010232975.9 dated Nov. 12, 2013, with English translation.

(Continued)

*Primary Examiner* — Jay Patel
*Assistant Examiner* — Francis G Geroleo
(74) *Attorney, Agent, or Firm* — Birch, Stewart, Kolasch & Birch, LLP

(57) ABSTRACT

An imaging method includes: calculating an amount of parallax between a reference optical system and an adjustment target optical system; setting coordinates of an imaging condition evaluation region corresponding to the first viewpoint image outputted by the reference optical system; calculating coordinates of an imaging condition evaluation region corresponding to the second viewpoint image outputted by the adjustment target optical system, based on the set coordinates of the imaging condition evaluation region corresponding to the first viewpoint image, and on the calculated amount of parallax; and adjusting imaging conditions of the reference optical system and the adjustment target optical system, based on image data in the imaging condition evaluation region corresponding to the first viewpoint image, at the set coordinates, and on image data in the imaging condition evaluation region corresponding to the second viewpoint image, at the calculated coordinates, and outputting the viewpoint images in the adjusted imaging conditions.

14 Claims, 21 Drawing Sheets

(56) References Cited

FOREIGN PATENT DOCUMENTS

| | | |
|---|---|---|
| JP | 2005-173270 A | 6/2005 |
| JP | 2007-006285 A | 1/2007 |
| JP | 2008-209760 A | 9/2008 |
| JP | 2009-47498 A | 3/2009 |
| JP | 2009-282117 A | 12/2009 |

OTHER PUBLICATIONS

Partial European Search Report for European Application No. 10251277.9 dated Nov. 22, 2013.
European Search Report for European Application No. 10251277.9 dated Jan. 30, 2014.

* cited by examiner

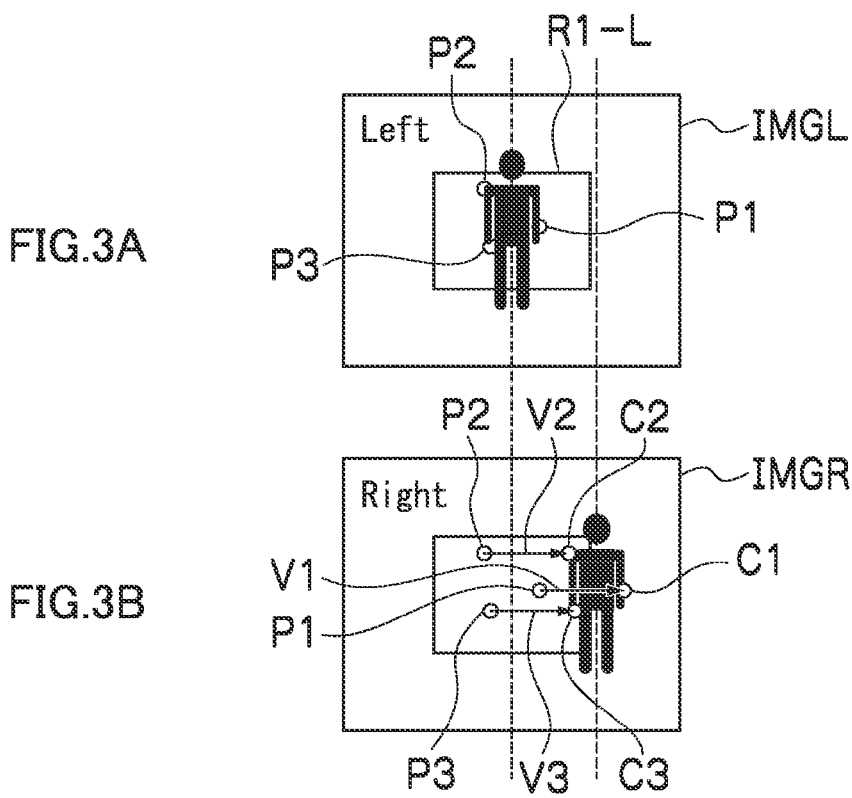
FIG.3A
FIG.3B
FIG.4
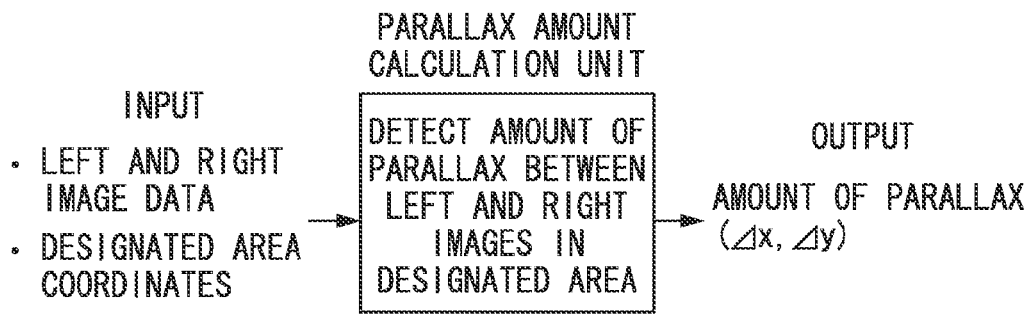
FIG.5
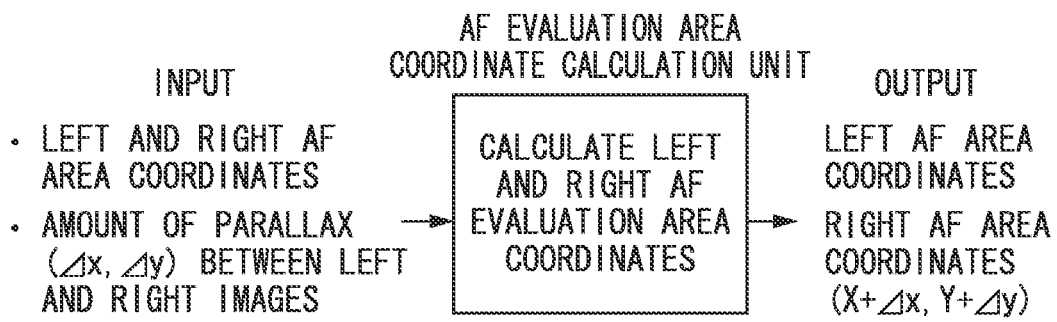

LEFT IMAGE

RIGHT IMAGE

FIG.9A
FIG.9B
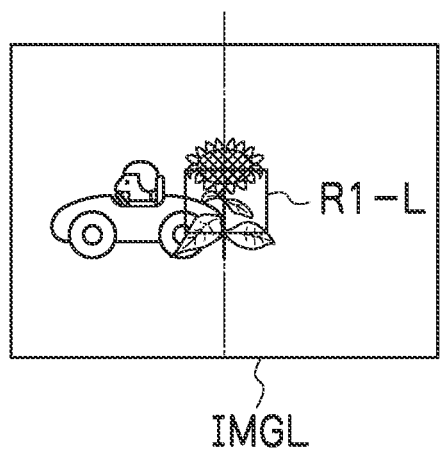
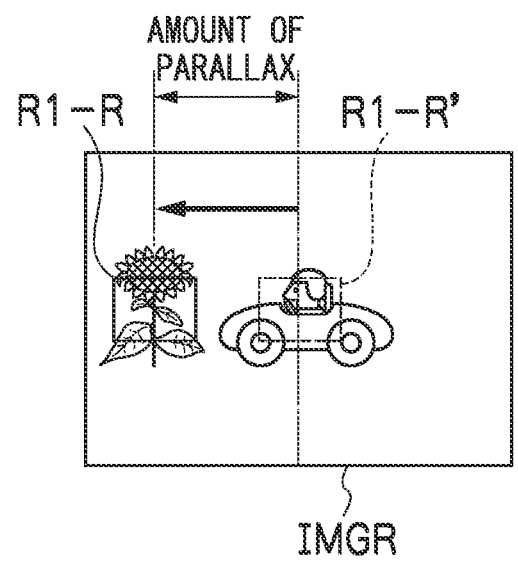

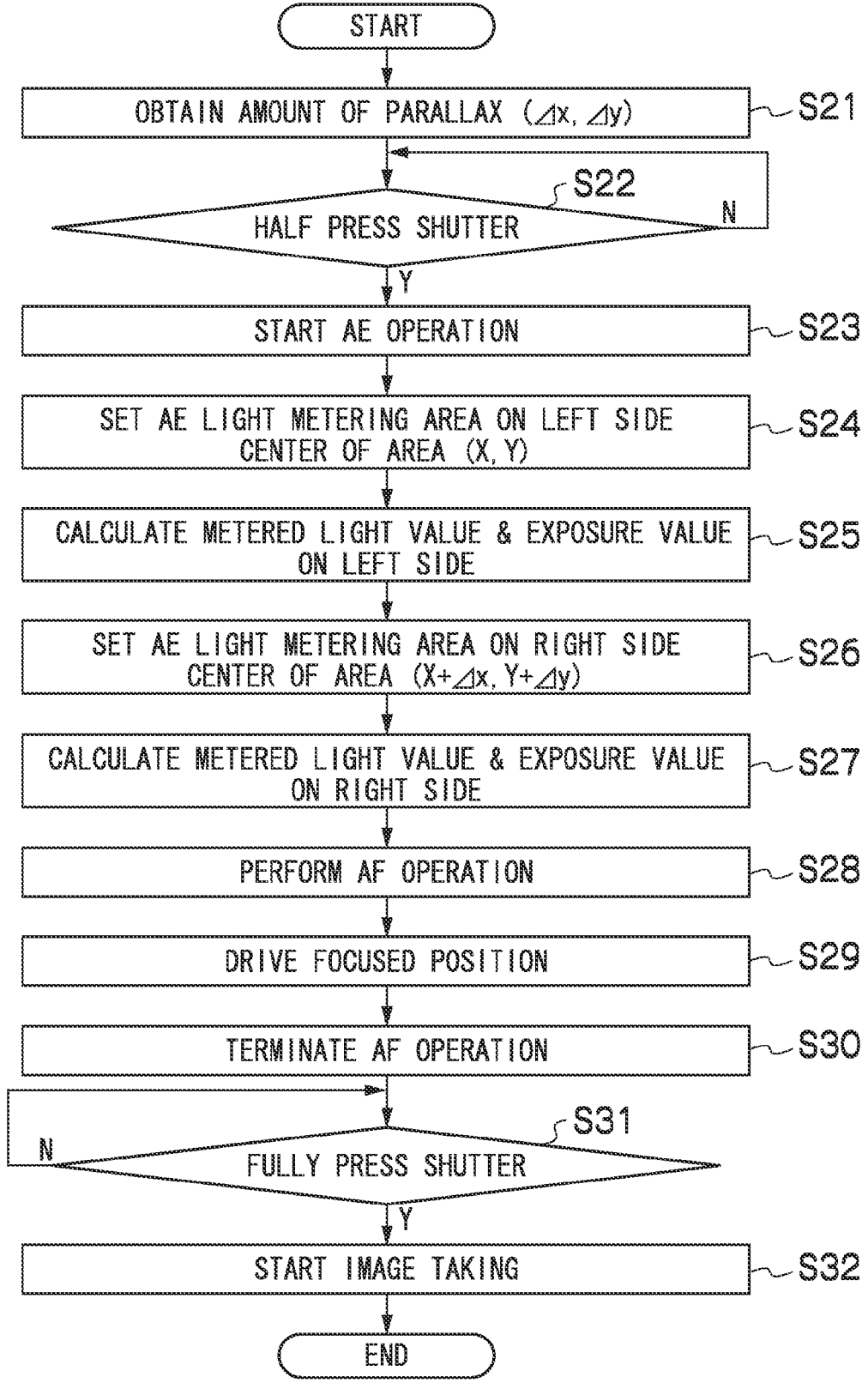

AE LIGHT METERING AREA IN LEFT IMAGE

IMGL

IMGR

IMAGING DEVICE, IMAGING METHOD AND RECORDING MEDIUM FOR ADJUSTING IMAGING CONDITIONS OF OPTICAL SYSTEMS BASED ON VIEWPOINT IMAGES

BACKGROUND OF THE INVENTION

1. Field of the Invention

The presently disclosed subject matter relates to an imaging device including a plurality of optical systems having a parallax, and more particularly, to a technique of preventing or minimizing a difference in an AF (automatic focus adjustment process) process or an AE (automatic exposure process) process between the plurality of optical systems.

2. Description of the Related Art

Japanese Patent Application Laid-Open No. 2005-173270 discloses a stereoscopic image taking optical device which causes left and right parallax images formed through left and right objective optical systems, to be alternately imaged, and also can adjust a convergence distance between the left and right objective optical systems by rotating mirrors provided in the left and right objective optical systems respectively. The stereoscopic image taking optical device includes an auto-focus device having an auto-focus function, and an auto-focus device which can cause the auto-focus device to function for each image of the left and right parallax images which have been alternately taken.

Japanese Patent Application Laid-Open No. 8-194274 discloses a stereoscopic imaging device mainly configured with two lens systems which obtain imaging information for the left eye or the right eye; a detection circuit which detects focus positions, eye direction angles and the like related to the lens systems; a CPU (central processing unit) including an area operation circuit which performs an operation of a focus detection range of a common subject for the two lens systems based on the detected information, a distance operation circuit, and the like; and a camera driving circuit for focus adjustment which performs the focus adjustment within the common detection range obtained from the operation.

Japanese Patent Application Laid-Open No. 2008-209760 discloses spot exposure metering, weighted averaging metering, and averaging metering. The spot exposure metering is a system for performing light metering only a predetermined region in a limited manner. The weighted averaging metering is a system for weighting a predetermined region and performing averaging metering for the entire region of a screen of a taken image. The averaging metering is a system for performing the averaging metering for the entire region of the screen of the taken image without weighting the predetermined region.

Japanese Patent Application Laid-Open No. 2009-47498 discloses a technique of detecting a feature point and a corresponding point in a stereo camera.

Japanese Patent Application Laid-Open No. 2009-282117 discloses a technique of flash light adjustment.

SUMMARY OF THE INVENTION

In the stereoscopic imaging device having a binocular parallax, if a focused area/light metering area is set in the center, a difference may occur between focused positions/exposure levels of left and right lenses due to the binocular parallax. In order to solve this problem, in Japanese Patent Application Laid-Open Nos. 2005-173270 and 8-194274, the focused positions of the left and right lenses coincide with each other.

In Japanese Patent Application Laid-Open No. 2005-173270, AF is performed in each of the left and right lenses, the other focus lens is set to one of the focused positions, and thereby a difference in an AF focused position is prevented. However, the focused position may exist in a region other than a stereoscopically viewable region. In this case, an appropriate stereoscopic image cannot be obtained.

In Japanese Patent Application Laid-Open No. 8-194274, even if the focused position is out of the stereoscopically viewable region, a convergence angle is changed so that stereoscopic viewing can be easily performed at the focused position. However, a mechanism for changing this convergence angle is complicated. As a result, the imaging device becomes huge, which raises costs.

An object of the presently disclosed subject matter is to provide a compact and inexpensive stereoscopic imaging device in which a difference between imaging conditions such as focused positions/exposure levels set for a left and right imaging unit is prevented or minimized so that a good stereoscopic effect can be obtained.

The presently disclosed subject matter provides an imaging device including an imaging unit configured to photoelectrically convert subject images formed via a reference optical system and an adjustment target optical system respectively, by an imaging element, and output viewpoint images for a left eye and a right eye; a parallax amount calculation unit configured to calculate an amount of parallax between the reference optical system and the adjustment target optical system; a setting unit configured to set coordinates of an imaging condition evaluation region corresponding to the first viewpoint image outputted by the reference optical system; a calculation unit configured to calculate coordinates of an imaging condition evaluation region corresponding to the second viewpoint image outputted by the adjustment target optical system, based on the coordinates of the imaging condition evaluation region corresponding to the first viewpoint image from the reference optical system, which have been set by the setting unit, and on the amount of parallax calculated by the parallax amount calculation unit; and a control unit configured to adjust imaging conditions of the reference optical system and the adjustment target optical system, based on image data in the imaging condition evaluation region corresponding to the viewpoint image from the reference optical system, at the coordinates set by the setting unit, and on image data in the imaging condition evaluation region corresponding to the viewpoint image from the adjustment target optical system, at the coordinates calculated by the calculation unit, and control the imaging unit to output the left and right viewpoint images in the adjusted imaging conditions.

Preferably, the imaging condition evaluation region includes a focus evaluation value calculation region.

Preferably, there are included a reference optical system-focus control unit, while changing a focus position of the reference optical system, configured to detect a focused position at which a contrast in the focus evaluation value calculation region located at the coordinates set by the setting unit becomes a local maximum, in the first viewpoint image outputted by the reference optical system, and to move the focus position of the reference optical system to the detected focused position; and an adjustment target optical system-focus control unit, while changing a focus position of the adjustment target optical system, configured to detect a focused position at which a contrast in the focus evaluation value calculation region located at the coordinates calculated by the calculation unit becomes a local maximum, in the second viewpoint image outputted by the adjustment target optical system, and to move the focus position of the adjustment target optical system to the detected focused position.

Preferably, the imaging condition evaluation region includes a subject luminance calculation region.

Preferably, there are included a reference optical system-exposure control unit configured to control an exposure of the reference optical system so that a subject luminance detected from the subject luminance calculation region located at the coordinates set by the setting unit becomes appropriate, in the first viewpoint image outputted by the reference optical system; and an adjustment target optical system-exposure control unit configured to control an exposure of the adjustment target optical system so that a subject luminance detected from the subject luminance calculation region located at the coordinates calculated by the calculation unit becomes appropriate, in the second viewpoint image outputted by the adjustment target optical system.

Preferably, there are included a reference optical system-exposure control unit configured to control an exposure of the reference optical system so that an average weight of subject luminances detected from respective divided regions of the subject luminance calculation region including a plurality of the divided regions which are weighted with the coordinates set by the setting unit at the center, becomes appropriate, in the first viewpoint image outputted by the reference optical system; and an adjustment target optical system-exposure control unit configured to control an exposure of the adjustment target optical system so that an average weight of subject luminances detected from respective divided regions of the subject luminance calculation region including a plurality of the divided regions which are weighted with the coordinates calculated by the calculation unit at the center, becomes appropriate, in the second viewpoint image outputted by the adjustment target optical system.

Preferably, the imaging condition evaluation region includes a light adjustment-luminance calculation region.

Preferably, the parallax amount calculation unit calculates the amount of parallax between the reference optical system and the adjustment target optical system, based on a parallax vector connecting a feature point detected from the imaging condition evaluation region whose coordinates have been set by the setting unit and which corresponds to the reference optical system, and a corresponding point corresponding to the feature point in the viewpoint image from the adjustment target optical system.

Preferably, the parallax amount calculation unit calculates the amount of parallax depending on at least one of a cross-point adjustment amount, an automatic parallax adjustment amount and a manual parallax adjustment amount.

Preferably, there is included a stereoscopic image output unit configured to output a stereoscopic image based on the left and right viewpoint images outputted by the imaging unit.

The presently disclosed subject matter provides an imaging method in which an imaging device including an imaging unit configured to photoelectrically convert subject images formed via a reference optical system and an adjustment target optical system respectively, by an imaging element, and output viewpoint images for a left eye and a right eye, executes the steps of: calculating an amount of parallax between the reference optical system and the adjustment target optical system; setting coordinates of an imaging condition evaluation region corresponding to the first viewpoint image outputted by the reference optical system; calculating coordinates of an imaging condition evaluation region corresponding to the second viewpoint image outputted by the adjustment target optical system, based on the set coordinates of the imaging condition evaluation region corresponding to the first viewpoint image outputted by the reference optical system, and on the calculated amount of parallax; and adjusting imaging conditions of the reference optical system and the adjustment target optical system, based on image data in the imaging condition evaluation region corresponding to the first viewpoint image outputted by the reference optical system, at the set coordinates, and on image data in the imaging condition evaluation region corresponding to the second viewpoint image outputted by the adjustment target optical system, at the calculated coordinates, and controlling the imaging unit to output the left and right viewpoint images in the adjusted imaging conditions.

The presently disclosed subject matter provides a computer-readable recording medium including instructions stored thereon, such that when the instructions are read and executed by a processor, the processor is configured to perform the steps of: calculating an amount of parallax between a reference optical system and an adjustment target optical system; setting coordinates of an imaging condition evaluation region corresponding to the first viewpoint image outputted by the reference optical system; calculating coordinates of an imaging condition evaluation region corresponding to the second viewpoint image outputted by the adjustment target optical system, based on the set coordinates of the imaging condition evaluation region corresponding to the first viewpoint image outputted by the reference optical system, and on the calculated amount of parallax; and adjusting imaging conditions of the reference optical system and the adjustment target optical system, based on image data in the imaging condition evaluation region corresponding to the first viewpoint image outputted by the reference optical system, at the set coordinates, and on image data in the imaging condition evaluation region corresponding to the second viewpoint image outputted by the adjustment target optical system, at the calculated coordinates, and outputting the viewpoint images in the adjusted imaging conditions.

According to the presently disclosed subject matter, a difference in evaluation of the imaging conditions (for example, the difference in the focused position or a difference in exposure control) between a plurality of imaging optical systems can be prevented or minimized, and a good stereoscopic image can be outputted.

BRIEF DESCRIPTION OF THE DRAWINGS

FIGS. 3A and 3B are diagrams illustrating an example of first and second image data;

FIG. 4 is a diagram schematically illustrating calculation of a final parallax vector ($\Delta x$, $\Delta y$);

FIG. 5 is a diagram schematically illustrating calculation of center coordinates ($X+\Delta x$, $Y+\Delta y$) in an AF evaluation area;

FIGS. 9A and 9B are diagrams illustrating an example of AF evaluation areas R1-L and R1-R;

FIG. 11 is a flowchart of the image taking process according to the second embodiment;

DETAILED DESCRIPTION OF THE PREFERRED EMBODIMENTS

<First Embodiment>

Figure 1:
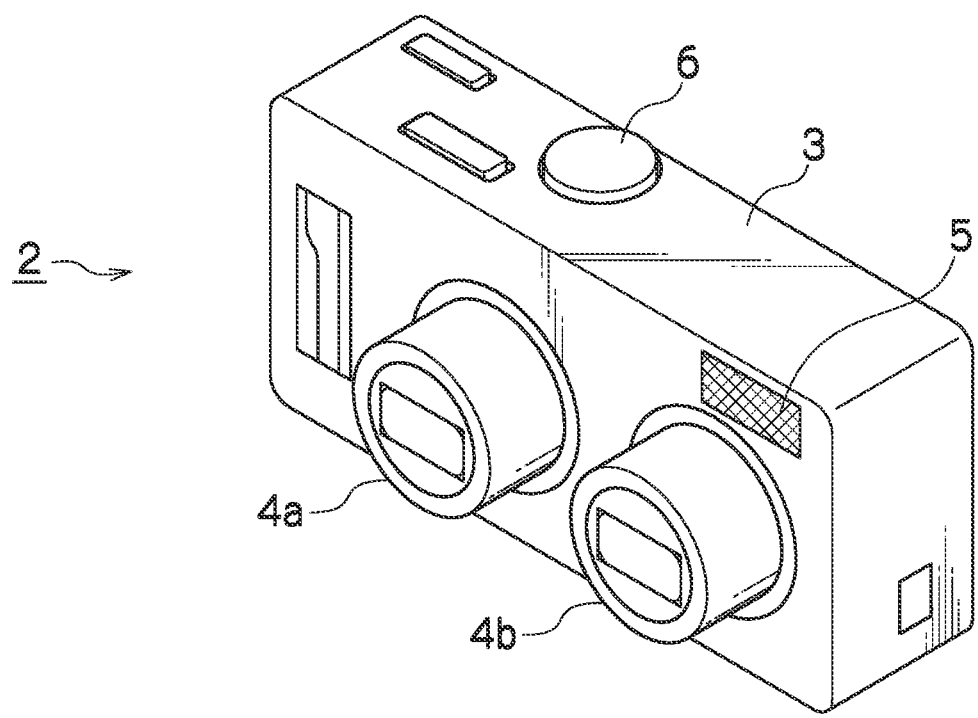
FIG. 1 is a front side perspective view of a camera.

FIG. 1 illustrates a front side perspective view of a camera 2. In FIG. 1, on the front surface of the camera 2, a first lens barrel 4a which includes a first image taking optical system 1a, and a second lens barrel 4b which includes a second image taking optical system 1b are built in. In addition, a flash 5 and the like are exposed on the front surface of the camera 2. The first and second lens barrels 4a and 4b are provided side by side at a regular interval in a horizontal direction, and extend forward from a camera main body 3 at the time of an image taking mode, and are contained in the camera main body 3 when power is turned off or at the time of an image reproduction mode. Moreover, on the upper surface of the camera 2, a shutter button 6 used for a shutter release operation is provided.

On the back surface of the camera 2 (not illustrated), an operation unit 10 including a zoom button, a menu button, and a cursor button, and a monitor 11 are provided. According to appropriate operations of the operation unit 10, power ON/OFF, switching between various modes including the image taking mode, and the image reproduction mode, zooming and the like are performed. The monitor 11 is a 3D monitor of a parallax barrier system (described later), or a lenticular system in which a lenticular lens is provided on the screen of the monitor 11, and functions as an electronic viewfinder when an image is taken, and functions as an image reproduction monitor when the image is reproduced. Here, the system of the monitor 11 is not limited to the parallax barrier system or the lenticular system, and other systems, for example, a time division system or a polarization filter system may be employed.

Figure 2:
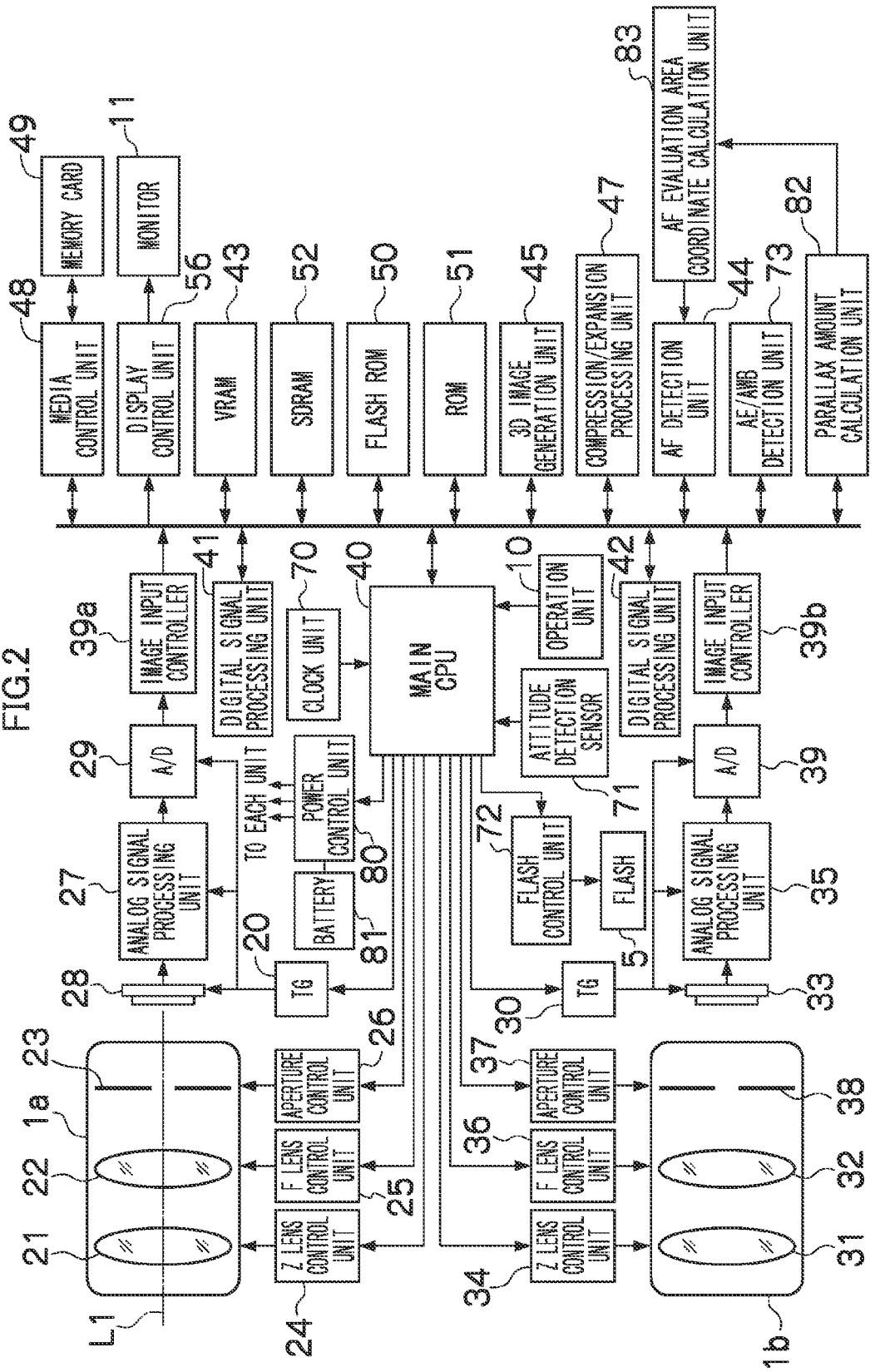
FIG. 2 is a block diagram of the camera according to a first embodiment.

FIG. 2 illustrates an electrical configuration of the camera 2. The first image taking optical system 1a includes a first variable magnification lens 21, a first focus lens 22, and a first aperture 23, which are arranged along a lens optical axis L1. The first variable magnification lens 21 is driven by a first variable magnification lens control unit (Z lens control unit) 24 which includes a direct current motor and a driver. The first focus lens 22 is driven by a first focus lens control unit (F lens control unit) 25 which includes a direct current motor and a driver. The first aperture 23 is driven by a first aperture control unit 26 which includes a direct current motor and a driver. Operations of the control units 24 to 26 are controlled by a main CPU (central processing unit) 40 (hereinafter simply represented as "CPU 40").

In response to an operation of inputting zoom direction information indicating tele or wide, to the zoom button (however, a ring shaped control member is also possible instead of the zoom button) of the operation unit 10, the first variable magnification lens control unit 24 moves the first variable magnification lens 21 from a home position as a starting point, along the lens optical axis L1, to a tele side (extension side)/wide side (containing side), and changes a focal length (image taking magnification). When the first variable magnification lens 21 is moved to the tele side, the focal length becomes long focus and an image taking range becomes small. When the first variable magnification lens 21 is moved to the wide side, the focal length becomes short focus and the image taking range becomes large.

The focus lens control unit 25 moves the first focus lens 22 along the lens optical axis L1, and performs focus adjustment. A position of the first focus lens 22 is automatically adjusted along with the movement of the first variable magnification lens 21 so that the focus is not shifted. It is assumed that zoom magnifications (zoom phases) Z1, Z2, . . . , Zn can be inputted from the operation unit 10 in a phased manner. While the number of the phases "n" is arbitrary, Z1 corresponds to a wide end and Zn corresponds to a tele end.

A target zoom direction set from the zoom button is outputted to the CPU 40. The CPU 40 sets a target zoom position according to the target zoom direction. If the target zoom direction is a tele direction, the zoom phase which is nearest on the side of the tele direction from a current position of the first variable magnification lens 21 is set as the target zoom position, and if the target zoom direction is a wide direction, the zoom phase which is nearest on the side of the wide direction from the current first variable magnification lens 21 is set as the target zoom position. The CPU 40 converts the target zoom position into the number of pulses to a target stop position of the first variable magnification lens 21, and causes the first variable magnification lens control unit 24 to perform the driving depending on the number of pulses. It should be noted that the number of pulses "0" corresponds to the home position.

A first image sensor 28 receives a light reflected by a subject (subject light) whose image has been formed by the first variable magnification lens 21 and the first focus lens 22, and accumulates photo charges depending on the amount of the received light, in a light receiving element. In the first image sensor 28, photo charge accumulation and transfer operations are controlled by a timing signal (clock pulse) which is periodically inputted from a timing generator 20 (TG: timing generator), and at the time of the image taking mode, an image signal for one screen is obtained at each predetermined period, and is sequentially inputted to a first analog signal processing unit 27. It should be noted that a solid-state imaging device of a CCD (charge-coupled device) type or a MOS (metal-oxide semiconductor) type is used as the first image sensor 28.

The first analog signal processing unit 27 receives an imaging signal for one screen which has been inputted from the first image sensor 28, amplifies R (red), G (green) and B (blue) image data which precisely correspond to the amount of the accumulated charges in each light receiving element, and inputs the data to a first A/D (analog to digital) converter 29. The first A/D converter 29 converts the inputted image data from analog to digital. The imaging signal from the first image sensor 28 becomes first image data (image data for the right eye) via the first analog signal processing unit 27 and the first A/D converter 29.

The second image taking optical system 1b has the same configuration as the first image taking optical system 1a, and includes a second variable magnification lens 31 which is driven by a second variable magnification lens control unit 34, a second focus lens 32 which is driven by a second focus lens control unit 36, and a second aperture 38 which is driven by a second aperture control unit 37. Operations of the respective control units 34, 36 and 37 are controlled by the CPU 40.

It should be noted that, in the second image taking optical system 1b, each member of the same nature as each member of the first image taking optical system 1a is used. Moreover, the first image taking optical system 1a and the second image taking optical system 1b are basically synchronized and work with each other to perform imaging operations, while each image taking optical system may be individually operated in order to improve a control speed or the like. Any one of the left and right optical systems may become the first image taking optical system 1a or the second image taking optical system 1b, and both are technically interchangeable. For convenience of explanation, a reference imaging unit is assumed to be the second image taking optical system 1b on the left, and an adjustment target imaging unit is assumed to be the first image taking optical system 1a on the right, while both may be interchanged.

A second analog signal processing unit 35 and a second A/D converter 39 have the same configurations as the first analog signal processing unit and the A/D converter 29, respectively. An imaging signal from a second image sensor 33 becomes second image data (image data for the left eye) via the second analog signal processing unit 35 and the second A/D converter 39.

The first and second image data outputted from the first and second A/D converters 29 and 39 are inputted via image input controllers 39a and 39b to digital signal processing units 41 and 42, respectively. The digital signal processing units 41 and 42 apply various kinds of image processing, such as tone correction, white balance correction and γ correction process, to each of the first and second image data. The first image data which has been processed by the digital signal processing unit 41 and outputted at each predetermined period is inputted to a VRAM (Video Random Access Memory) 43. The second image data which has been processed by the digital signal processing unit 42 and outputted at each predetermined period is inputted to the VRAM 43.

The VRAM 43 is a work memory which temporarily stores the first and second image data. It should be noted that if the first and second image data at the next period is inputted to the VRAM 43 in a state where the first and second image data has already been stored in the VRAM 43, the first and second image data which has already been stored is overwritten with the first and second image data which is newly inputted. The first and second image data which is repeatedly overwritten and updated at each predetermined period in the VRAM 43 is referred to as "live view image (live preview image, through image)".

A three-dimensional (3D) image generation unit 45 synthesizes the first and second image data stored in the VRAM 43, as stereoscopic image data for performing stereoscopic display by the monitor 11. A display control unit 56 causes the stereoscopic image data synthesized by the 3D image generation unit 45, to be displayed as the through image on the monitor 11, when the monitor 11 is used as the electronic viewfinder at the time of the image taking mode.

Recording of taken images will be described below. The images, which have been captured by using the first image taking optical system 1a and the second image taking optical system 1b at a timing when the shutter button 6 has been depressed, are processed by the analog signal processing units 27 and 35, respectively, and subsequently converted into digital signals by the A/Ds 29 and 39, and inputted via the image input controllers 39a and 39b to the digital signal processing units 41 and 42, respectively. The digital signal processing units 41 and 42 apply the various kinds of image processing, such as the tone correction, the white balance correction and the γ correction process, to each of the first and second image data. The first and second image data, which has been processed by the digital signal processing units 41 and 42 and outputted, are recorded in an SDRAM (Synchronous Dynamic Random Access Memory) 52. A compression/expansion processing unit 47 applies a compression process to the stored first and second image data, in a compression format such as the JPEG (Joint Photographic Experts Group) system. The SDRAM 52 is used as a temporary storage area required for this compression process. A media control unit 48 causes each image data applied with the compression process by the compression/expansion processing unit 47, to be recorded in a memory card 49.

If the first and second image data recorded in the memory card 49 in this way is reproduced and displayed on the monitor 11, each image data recorded in the memory card 49 is read by the media control unit 48. Each image data applied with an expansion process by the compression/expansion processing unit 47 is converted into the stereoscopic image data by the 3D image generation unit 45, and is subsequently reproduced and displayed on the monitor 11 via the display control unit 56.

Although a detailed structure of the monitor 11 is not illustrated, the monitor 11 includes a parallax barrier display layer on a surface thereof. In the monitor 11, a parallax barrier including a pattern, in which light transmissive portions and light blocking portions are alternately arranged at a predetermined pitch, is generated on the parallax barrier display layer, and also, on an image display surface which is a lower layer thereof, strip-shaped image fragments representing left and right images are alternately arranged and displayed. Then, the parallax barrier allows a left eye and a right eye to see an image for the left eye (a left eye image) and an image for the right eye (a right eye image) respectively, and thereby, a viewer is enabled to get a sense of a stereoscopic effect of the image. The system of the monitor 11 is not limited to the parallax barrier system, and another system which can realize a similar function may be used.

The CPU 40 controls the entire operation of the camera 2 in an integrated manner. To the CPU 40, a flash control unit 72 which controls light emission of the flash 5, and the operation unit 10 are connected. Moreover, a flash ROM (Read Only Memory) 50 is connected to the CPU 40. While the flash ROM 50 is a nonvolatile memory which can electrically rewrite data, the flash ROM 50 can store any data as long as a free space exists.

A ROM 51 stores a control program for executing various processes by the CPU 40. A clock unit 70 counts the current time and outputs the current time to the CPU 40. An attitude detection sensor 71 detects an image taking attitude indicating whether the camera 2 is horizontally placed or vertically placed, at a timing instructed by the CPU 40, for example, at a time point when the shutter button is half pressed, and outputs a result of the detection to the CPU 40. When a power control unit 80 senses a power ON signal or OFF signal emitted from the CPU 40 in response to an ON or OFF operation of a power switch included in the operation unit 10, the power control unit 80 controls to turn on or off power supplied to each block in the camera 2 from a battery 81.

An AF detection unit 44 calculates a first AF evaluation value and a second AF evaluation value from the first image data and the second image data stored in the VRAM 43, respectively. The first AF evaluation value and the second AF evaluation value are calculated by integrating a high-frequency component of a luminance value for a region designated by the CPU 40 (for example, a central portion) in each image data, and represent sharpness of the image. The first and second AF evaluation values become larger as AF is closer to a focused point, and become maximum when the AF is in focus.

An AE/AWB (automatic exposure/automatic white balance correction) detection unit 73 detects a subject luminance (meters brightness of a subject) based on each of the first image data and the second image data stored in the VRAM 43, and sets the subject luminances detected from the first image data and the second image data, as a first metered light value and a second metered light value, respectively. Moreover, the AE/AWB detection unit 73 detects a first WB (white balance) value and a second WB value based on each of the first image data and the second image data stored in the VRAM 43. A system which calculates an exposure value is arbitrary, and may be any of spot exposure metering, weighted averaging metering, and averaging metering. The first and second metered light values, the first and second WB values, as well as the first and second AF evaluation values, which have been obtained, are notified to the CPU 40, and are used for controlling AE, AWB and the AF of the image signals obtained from the first image taking optical system 1a and the second image taking optical system 1b.

The CPU 40 reads out a program diagram which defines a mutual correspondence relationship among the metered light value, an aperture value, sensitivity, and shutter seconds, from the ROM 51 to the SDRAM 52, refers to the program diagram, sets the aperture values and the sensitivity corresponding to the first metered light value and the second metered light value which have been detected by the AE/AWB detection unit 73, to the aperture control units 26 and 37 as well as the image sensors 28 and 33, respectively, and performs exposure control.

A parallax amount calculation unit 82 detects an amount of parallax between the first image data and the second image data. Specifically, first, for the image obtained from the reference imaging unit, which is, here, the second image data IMGL obtained from the second image taking optical system 1b (see FIG. 3A), the parallax amount calculation unit 82 extracts a plurality of feature points (P1 to P3), from inside of an AF evaluation area R1-L of a predetermined shape and a predetermined size in which center coordinates (X,Y) are set. While the center coordinates (X, Y) have been previously set and saved in the ROM 51, the center coordinates (X,Y) may be able to be changed according to an instruction from the CPU 40 or the operation unit 10. For example, the center coordinates (X, Y) are the central portion of the image data, which, however, is not limited thereto. For example, the CPU 40 may perform a specific kind of object detection such as face detection or the like, in the image from the reference imaging unit, and may set the center of the detected object, as the center coordinates (X, Y). Moreover, the shape of the AF evaluation area R is not limited to a rectangle, and may be another shape such as a circular or elliptical shape. Moreover, the size of the AF evaluation area R is also arbitrary.

The feature point (P1 to P3) is a point (pixel) having strong signal gradients in a plurality of directions, and for example, can be extracted by using the Harris's method or the Shi-Tomasi's method. Subsequently, the parallax amount calculation unit 82 extracts corresponding points (C1 to C3), which are points on the first image data IMGR and correspond to the respective feature points (P1 to P3) extracted from the second image data IMGL, from the first image data (see FIG. 3B). An approach for detecting the feature point and the corresponding point can be performed similarly to the conventional art (for example, Japanese Patent Application Laid-Open No. 2009-47498). A line segment connecting this feature point and the corresponding point is a parallax vector. In FIGS. 3A and 3B, there are a plurality of sets of the feature points P1 to P3 and the corresponding points C1 to C3, and parallax vectors V1 to V3 corresponding to the respective sets are detected.

The parallax amount calculation unit 82 calculates a final parallax vector ($\Delta x, \Delta y$) according to the following equations.

$$\Delta x = OAC\_CP\_ADJH + OAC\_AUTO\_ADJH + OAC\_USR\_ADJH$$

$$\Delta y = OAC\_CP\_ADJV + OAC\_AUTO\_ADJV + OAC\_USR\_ADJV$$

Here, parameters of the equations are as follows, and have signs corresponding to enlargement or reduction of the amount of parallax.

OAC_CP_ADJH and OAC_CP_ADJV: cross-point adjustment amounts related to horizontal (X) and vertical (Y) directions, respectively. In other words, shift amounts by which adjustment should be performed so that optical axes L1 and L2 of the first image taking optical system 1a and the second image taking optical system 1b intersect at a cross point at a predetermined distance.

OAC_AUTO_ADJH and OAC_AUTO_ADJV: automatic parallax adjustment amounts related to the horizontal (X) and vertical (Y) directions, respectively. This automatic parallax adjustment amount is the parallax vector which is the line segment connecting the feature point and the corresponding point as described above.

OAC_USR_ADJH and OAC_USR_ADJV: parallax adjustment amounts related to the horizontal (X) and vertical (Y) directions, respectively, according to user operations. These parameters can be arbitrarily set from a user interface such as a parallax adjustment button provided on the operation unit 10.

Even when not all these parameters exist, if some of these parameters, that is, at least one parameter exists, values of other nonexistent parameters are set to "0", and the final parallax vector ($\Delta x$, $\Delta y$) can be calculated.

The parallax amount calculation unit 82 can also calculate and define the final parallax vector based on a plurality of the parallax vectors. The parallax vectors of the same length must be detected from subjects at the same distance. However, if subjects at difference distances are mixed in an image region from which the feature points are extracted, all the parallax vectors do not necessarily have the same length. Hence, the parallax amount calculation unit 82 defines the final parallax vector ($\Delta x$, $\Delta y$) according to one of the following rules 1 to 4 (see FIG. 4). Any rule may be arbitrarily employed.

1. Define an average value of the plurality of parallax vectors, as the final parallax vector.
2. Define a mode value of the plurality of parallax vectors, as the final parallax vector.
3. Define the longest parallax vector as the final parallax vector.
4. Define the parallax vector of a subject which is nearest to the camera 2, as the final parallax vector.

An AF evaluation area coordinate calculation unit 83 calculates center coordinates (X+$\Delta x$, Y+$\Delta y$) in the AF evaluation area for the first image data IMGR, based on the final parallax vector ($\Delta x$, $\Delta y$) detected by the parallax amount calculation unit 82, and the center coordinates (X, Y) in the AF evaluation area for the second image data IMGL (see FIG. 5).

It should be noted that a final parallax vector ($\Delta x'$, $\Delta y'$) may be detected by extracting the feature points from the first image data IMGR and extracting the corresponding points from the second image data IMGL. In this case, based on the final parallax vector ($\Delta x'$, $\Delta y'$) and center coordinates (X', Y') in the AF evaluation area for the first image data IMGR, center coordinates (X'+$\Delta x'$, Y'+$\Delta y'$) in the AF evaluation area for the second image data IMGL are calculated. Basically, if a region R is set in any one of the first image data IMGR and the second image data IMGL, and the feature points in the region R are extracted, the center coordinates in the AF evaluation area of the other one of the first image data and the second image data can be calculated.

In a case where there is no subject at an intersection point (also referred to as "cross point") between the optical axes L1 and L2 of the first image taking optical system 1a and the second image taking optical system 1b, if it is assumed that a focused area is set at the same position (for example, an image central portion) in both the first image taking optical system 1a and the second image taking optical system 1b, the subjects included in the respective AF evaluation areas are different, and thus, the evaluation values thereof are also different, and focused positions of the focus lenses 22 and 32 of the first image taking optical system 1a and the second image taking optical system 1b, which are set by an AF process, are also different.

Figure 6:
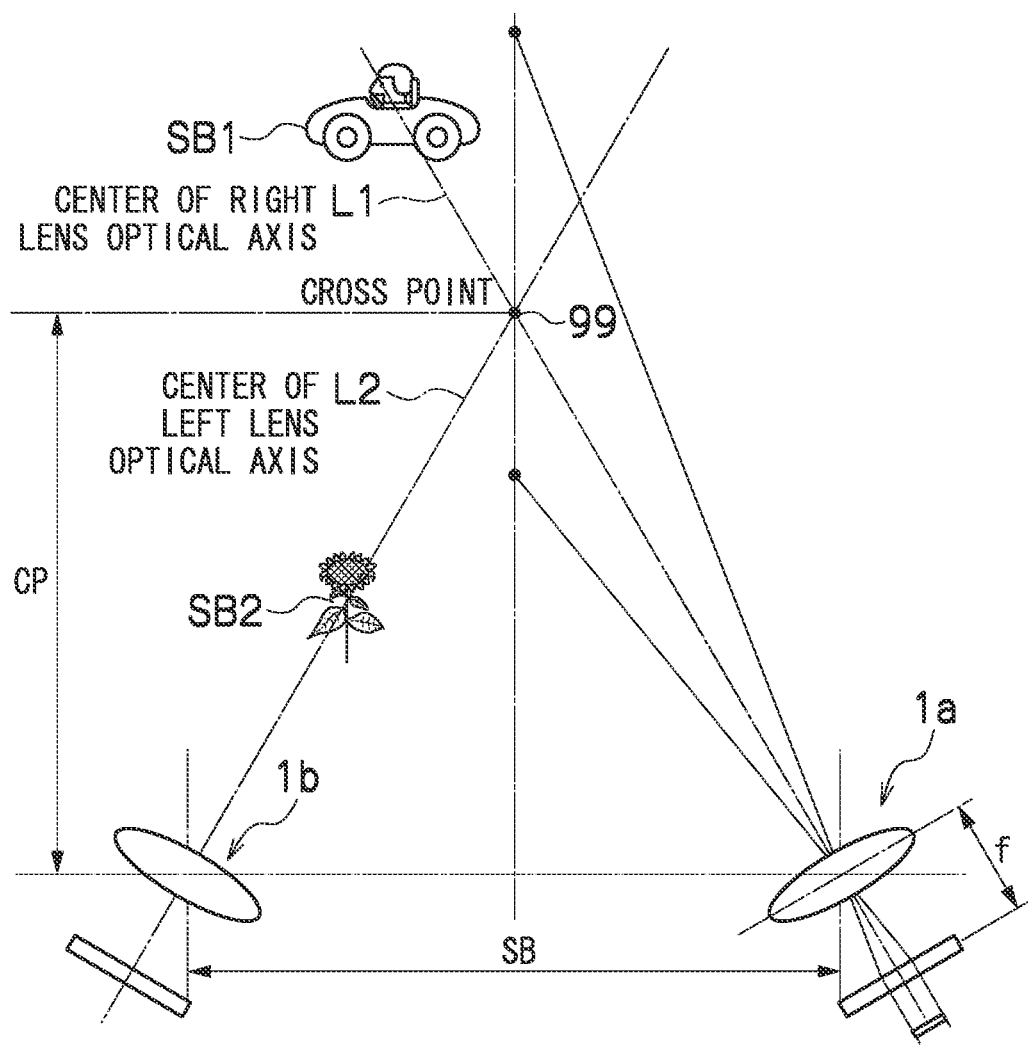
FIG. 6 is a diagram illustrating an example of a parallax between a first image taking optical system $1a$ and a second image taking optical system $1b$.
Figure 7A:
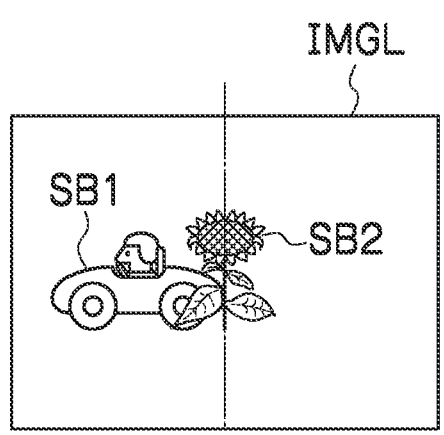
FIGS. 7A and 7B are diagrams illustrating an example in which the first image taking optical system $1a$ has focused on a subject SB1, the second image taking optical system $1b$ has focused on a subject SB2, and the subjects are at different distances, respectively.
Figure 7B:
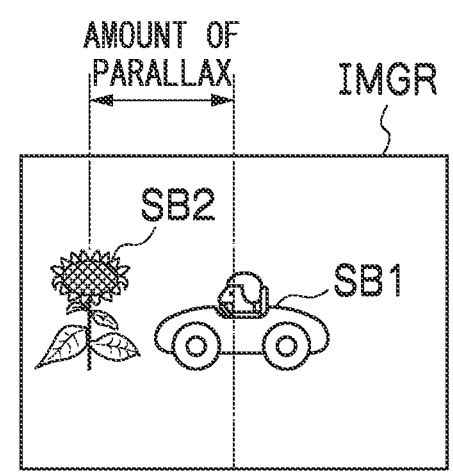

For example, as illustrated in FIG. 6, due to effects of a parallax SB between the first image taking optical system 1a and the second image taking optical system 1b, distances from the first image taking optical system 1a and the second image taking optical system 1b to subjects SB1 and SB2 are different, respectively. If it is assumed that the focused area is set at the image central portion in both the first image taking optical system 1a and the second image taking optical system 1b, as illustrated in FIGS. 7A and 7B, the first image taking optical system 1a and the second image taking optical system 1b focus on the subjects at different distances, respectively, that is, the first image taking optical system 1a focuses on the subject SB1, and the second image taking optical system 1b focuses on the subject SB2. Accordingly, a difference between positions of the left and right focus lenses 22 and 32 becomes large, and an appropriate stereoscopic image cannot be obtained, which also causes eye strain of the viewer. In the present embodiment, in order to prevent this difference in the focused position, the following image taking process is performed.

Figure 8:
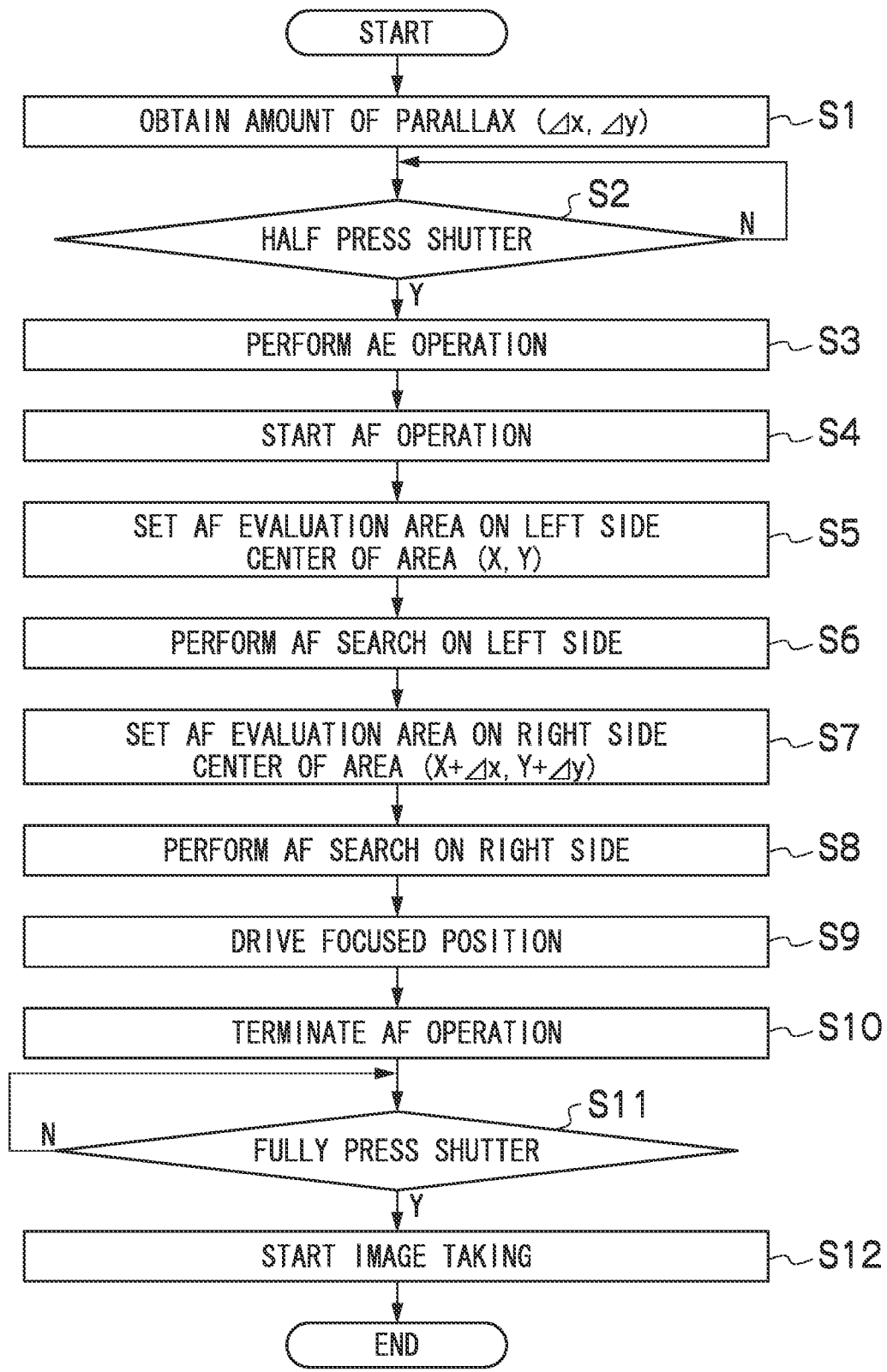
FIG. 8 is a flowchart of an image taking process according to the first embodiment.

FIG. 8 illustrates a flowchart of the image taking process according to the first embodiment of the presently disclosed subject matter. Execution of this process is controlled by the CPU 40. A program for causing the CPU 40 to execute this process is stored in the ROM 51. It should be noted that a personal computer or the like having a hardware configuration equivalent to the CPU 40 can also control the execution of the following process, and thus, the CPU 40 does not necessarily need to be included in the camera 2.

In S1, the CPU 40 sets the center coordinates (X, Y) in the AF evaluation area R1-L in the second image data (the image data from the reference imaging unit) which is currently stored in the VRAM 43, and controls the parallax amount calculation unit 82 to detect the feature points in a designated AF evaluation area R1-L and the corresponding points which are the points corresponding thereto in the first image data, and to perform the calculation of the final parallax vector ($\Delta x$, $\Delta y$) based on the feature points and the corresponding points which have been detected (see FIG. 4). A timing of the calculation of the final parallax vector ($\Delta x$, $\Delta y$) is arbitrary if the timing is before the image taking is started. For example, immediately after the camera 2 is powered on, the cross-point adjustment amount may be set and the parallax adjustment amount according to the user operation may be set. However, the obtaining of the automatic parallax adjustment amount may be executed after the shutter button is half pressed.

In S2, it is determined whether or not the shutter button has been half pressed. If the half pressing is determined, the process proceeds to S3, and if the half pressing is not determined, the above determination is repeated.

In S3, the AE/AWB detection unit 73 is controlled to detect the first metered light value, the second metered light value, the first WB (white balance) value and the second WB value from the first and second image data. While the system which calculates the exposure value in the AE/AWB detection unit 73 is arbitrary, the system may be a system of a second or third embodiment to be described later.

In S4, in response to termination of the detection of the first metered light value, the second metered light value, the first WB value and the second WB value, the following AF process is started. First, the CPU 40 moves the focus lenses 22 and 32 by each predetermined step in a predetermined range (hereinafter referred to as "AF search range") from a close range to infinity.

In S5, the center coordinates (X, Y) in the AF evaluation area are set in each second image data obtained by the imaging at each moving position of the reference imaging unit, here, the second image taking optical system 1b.

In S6, the second AF evaluation value corresponding to each moving position is obtained from the second image data IMGL corresponding to each moving position. In other words, the AF detection unit 44 is controlled to calculate the second AF evaluation value corresponding to each moving position, based on image data in the AF evaluation area R1-L of the predetermined shape and the predetermined size (see FIG. 9A), which has the center coordinates (X, Y) set in each second image data IMGL corresponding to each moving position.

In S7, the AF evaluation area coordinate calculation unit 83 is controlled to calculate the center coordinates (X+Δx, Y+Δy) in the AF evaluation area for the first image data IMGR obtained from the adjustment target imaging unit, in this embodiment, the first image taking optical system 1a (see FIG. 5).

In S8, an AF evaluation area R1-R of a predetermined shape and a predetermined size, which has the center coordinates (X+Δx, Y+Δy), is set in each first image data IMGR obtained by the imaging at each moving position of the first image taking optical system 1a. In FIG. 9B, an area R1-R' is an original (not moved) light evaluation area. Then, the AF detection unit 44 is controlled to calculate the first AF evaluation value corresponding to each moving position, based on image data in the AF evaluation area R of the first image data corresponding to each moving position.

In S9, the focus lens 22 is moved to a position of the focus lens 32 (first focused position) corresponding to a maximum value in the first AF evaluation values corresponding to the respective moving positions. Moreover, the focus lens 32 is moved to a position of the focus lens 32 (second focused position) corresponding to a maximum value in the second AF evaluation values corresponding to the respective moving positions.

In S10, in response to stop of the focus lens 22 at the first focused position, and stop of the focus lens 32 at the second focused position, the process proceeds to S11.

In S11, it is determined whether or not the shutter button has been fully pressed. If it is determined that the full pressing has been performed, the process proceeds to S12. If it is determined that the full pressing is not performed, this determination is repeated.

In S12, the imaging of the first and second image data to be recorded is performed. The obtained image data is stored in the memory card 49.

It should be noted that, when a moving image is taken or when a continuous AF process is performed, the determination of the half pressing may not trigger the process to proceed to S3, and instead, routines in S3 to S10 may be periodically repeated. Moreover, existence of only at least one reference optical system is required, and a plurality of adjustment target optical systems may exist.

According to the above process, the camera 2 sets the center coordinates of the AF evaluation areas of the reference imaging unit and the adjustment target imaging unit so that the parallax between the AF evaluation areas is eliminated (FIGS. 9A and 9B). Hence, the difference between the focused positions of the left and right images can be prevented (minimized), and a stable stereoscopic image can be imaged which is easily viewable and does not make the viewer get tired easily.

<Second Embodiment>

It is assumed that, if there is no subject at the intersection point (also referred to as "cross point") between the optical axes L1 and L2 of the first image taking optical system 1a and the second image taking optical system 1b (see FIG. 6), an AE process of the spot exposure metering system is executed. If it is assumed that a spot metering area is set at the same position (for example, the image central portion) in both the first image taking optical system 1a and the second image taking optical system 1b as the conventional art, the subjects included in the spot metering areas in the first and second image data are different due to the effects of the parallax, and thus, exposures of the first image taking optical system 1a and the second image taking optical system 1b, which are set by the AE process, are also different. If an exposure level is greatly different between the left and right images, the appropriate stereoscopic image cannot be obtained, which makes the viewer get tired. In the present embodiment, in order to prevent this difference in the exposure, the following image taking process is performed.

Figure 10:
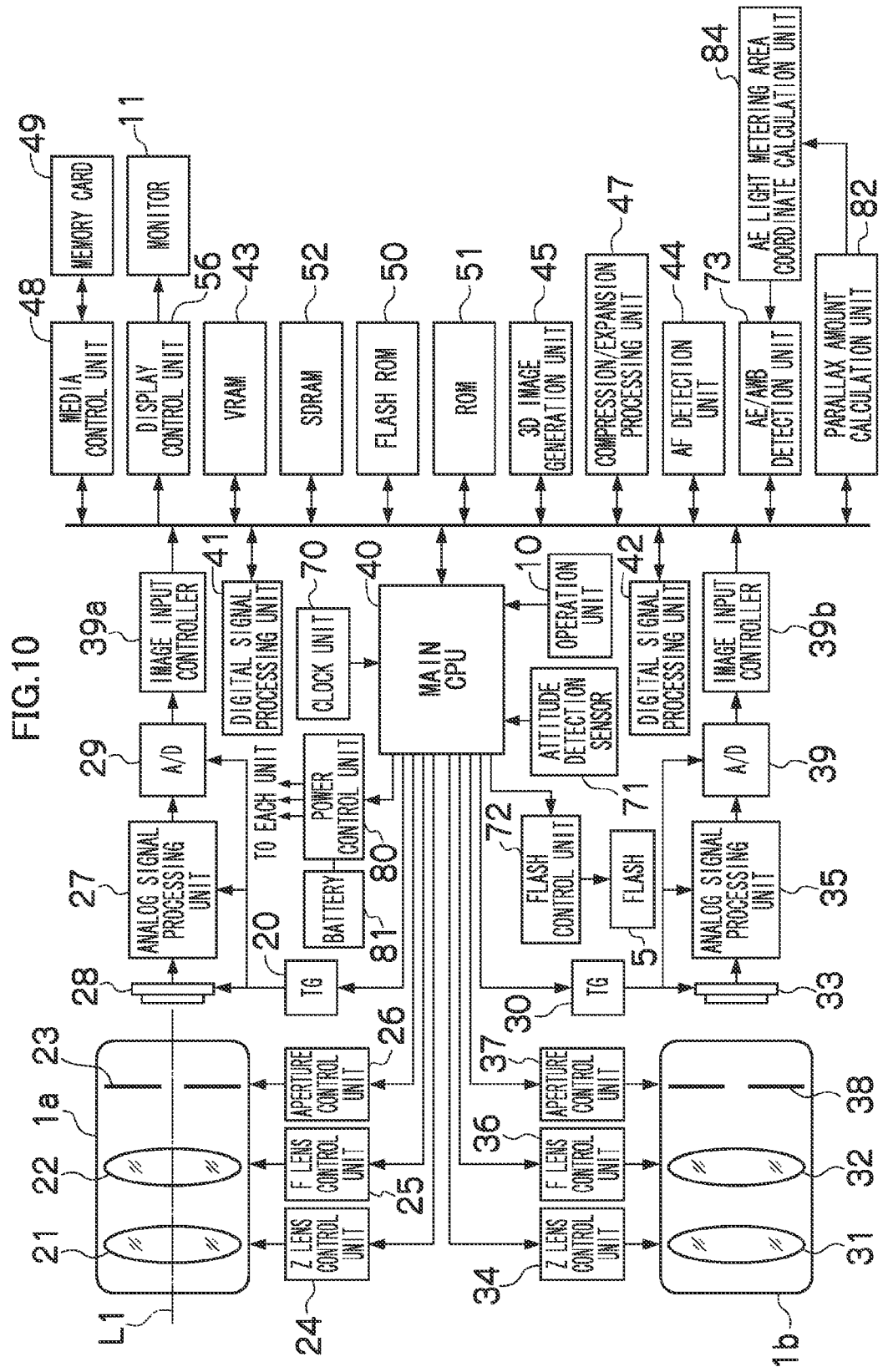
FIG. 10 is a block diagram of the camera according to a second embodiment.

FIG. 10 illustrates blocks of the camera 2 according to the second embodiment of the presently disclosed subject matter. The same blocks as those of the first embodiment are assigned with the same reference numerals. This camera 2 has an AE light metering area coordinate calculation unit 84.

Hereinafter, with reference to a flowchart of FIG. 11, a flow of the image taking process according to the second embodiment of the presently disclosed subject matter will be described. Execution of this process is controlled by the CPU 40. A program for causing the CPU 40 to execute this process is stored in the ROM 51. It should be noted that the personal computer or the like having the hardware configuration equivalent to the CPU 40 can also control the execution of the following process, and thus, the CPU 40 does not necessarily need to be included in the camera 2.

S21 to 22 are similar to S1 to 2, respectively. In S21, the final parallax vector (Δx, Δy) is defined.

In S23, in response to the definition of the final parallax vector (Δx, Δy), the following AE process is started.

Figure 12A:
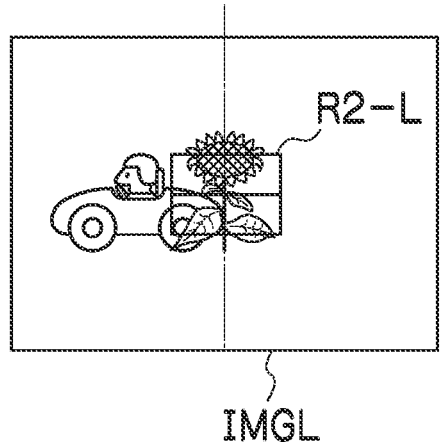
FIGS. 12A and 12B are diagrams illustrating an example of spot metering areas R2-L and R2-R.

In S24, the AE/AWB detection unit 73 is controlled to set a spot metering area R2-L (see FIG. 12A) of a predetermined shape and a predetermined size, which has the center coordinates (X, Y), in the image data, that is, the second image data IMGL, which is obtained by the imaging by the reference imaging unit, in this embodiment, the second image taking optical system 1b, in response to the half pressing of the shutter button. While the center coordinates (X, Y) have been previously set and saved in the ROM 51, the center coordinates (X, Y) may be able to be changed according to the instruction from the CPU 40 or the operation unit 10.

In S25, the AE/AWB detection unit 73 is controlled to calculate the second metered light value and the second WB value from image data in the light metering area R2-L set in the second image data IMGL (spot metering).

Figure 13:
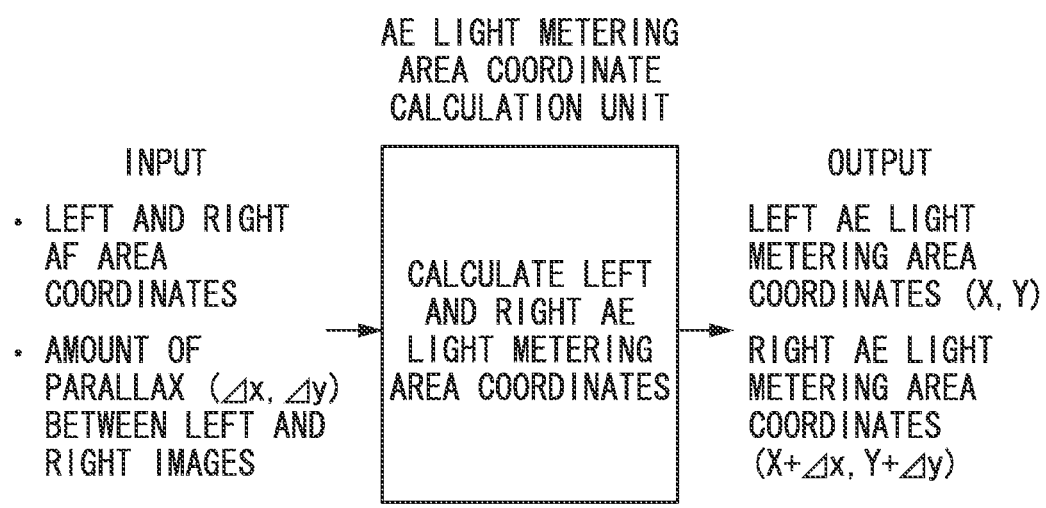
FIG. 13 is a diagram schematically illustrating calculation of center coordinates (X+Δx, Y+Δy) in the spot metering area.

In S26, the AE light metering area coordinate calculation unit 84 is controlled to calculate center coordinates (X+Δx, Y+Δy) in an AE evaluation area for the first image data (see FIG. 13).

Figure 12B:
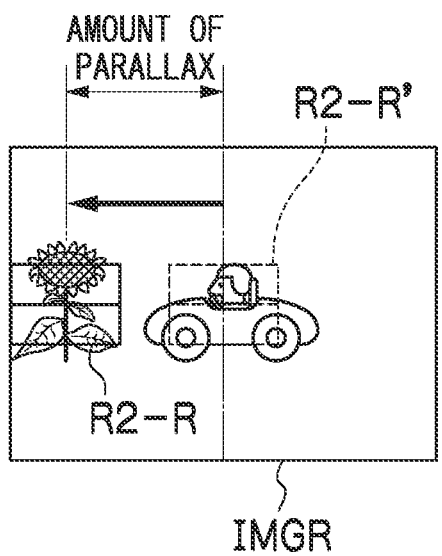

In S27, the AE/AWB detection unit 73 is controlled to set a spot metering area R2-R of a predetermined shape and a predetermined size, which has the center coordinates (X+Δx, Y+Δy), in the image obtained by the imaging at each moving position of the adjustment target imaging unit, here, the first image data obtained by the imaging by the first image taking optical system 1a. In FIG. 12B, an area R2-R' is an original (not moved) spot metering area. Then, the AE/AWB detection unit 73 is controlled to calculate the first metered light value and the first WB value based on image data in the AE light metering area R2-R in the first image data IMGR (spot metering). Then, the exposure control is performed based on the first metered light value, the first WB value, the second metered light value, and the second WB value, which have been obtained.

In S28 to S30, the AF process is performed. This AF process is preferably the AF process described in S4 to S10 of the first embodiment, respectively, which, however, may be a conventional AF process.

S31 to S32 are similar to S11 to S12, respectively.

According to the above process, the spot metering area is shifted by the amount of parallax between the reference imaging unit and the adjustment target imaging unit. The parallax between the spot metering areas of the left and right imaging systems in the adjustment target imaging unit can be eliminated (minimized), the differences in the metered light value and in the exposure level can be prevented (minimized), and the stereoscopic image in a stable state where the image is easily viewable and the viewer does not get tired easily, can be provided to the viewer. It should be noted that the reference imaging unit can also be the first image taking optical system 1a, and the adjustment target imaging unit can also be the second image taking optical system 1b. Moreover, when the moving image is taken or when the continuous AF process is performed, the determination of the half pressing of the shutter button 6 may not trigger the process to proceed to S23, and instead, routines in S23 to S30 may be periodically repeated.

<Third Embodiment>

It is assumed that, if there is no subject at the intersection point (also referred to as "cross point") between the optical axes L1 and L2 of the first image taking optical system 1a and the second image taking optical system 1b (see FIG. 6), the AE process of the weighted average metering is executed. If it is assumed that a weight for appropriate exposure value calculation corresponding to each small region partitioning the image is set as the same in both the first image taking optical system 1a and the second image taking optical system 1b as the conventional art, a subject portion included in the small region at the same position is different between the first and second image data due to the effects of the parallax, and thus, the exposures of the first image taking optical system 1a and the second image taking optical system 1b, which are set by the AE process, are also different. If the exposure level is greatly different between the left and right images, the appropriate stereoscopic image cannot be obtained, which makes the viewer get tired. In the present embodiment, in order to prevent this difference in the exposure, the following image taking process is performed.

Figure 14:
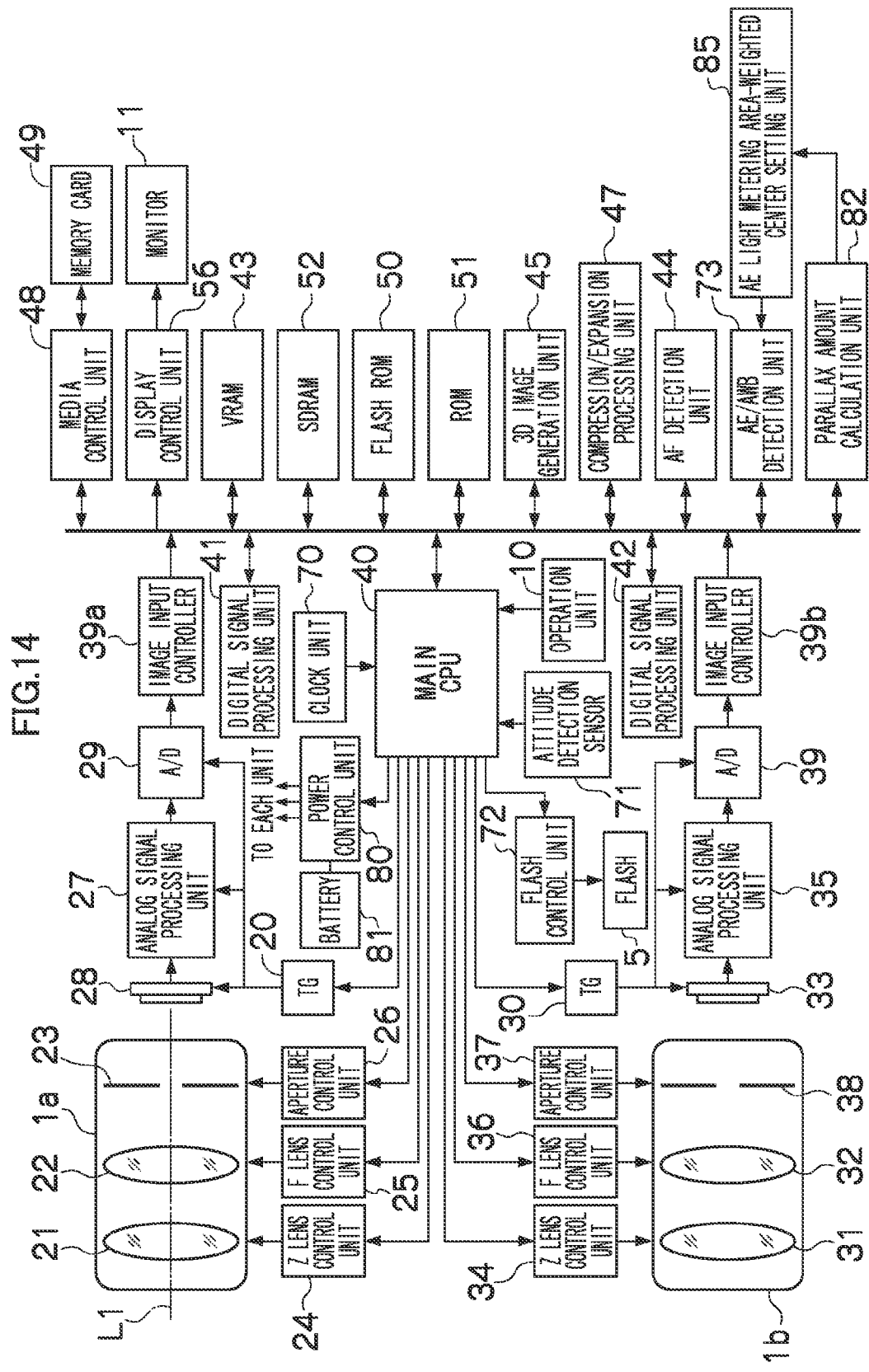
FIG. 14 is a block diagram of the camera according to a third embodiment.

FIG. 14 illustrates the blocks of the camera 2 according to the third embodiment of the presently disclosed subject matter. The same blocks as those of the first or second embodiment are assigned with the same reference numerals. This camera 2 has an AE light metering area-weighted center setting unit 85.

Figure 15:
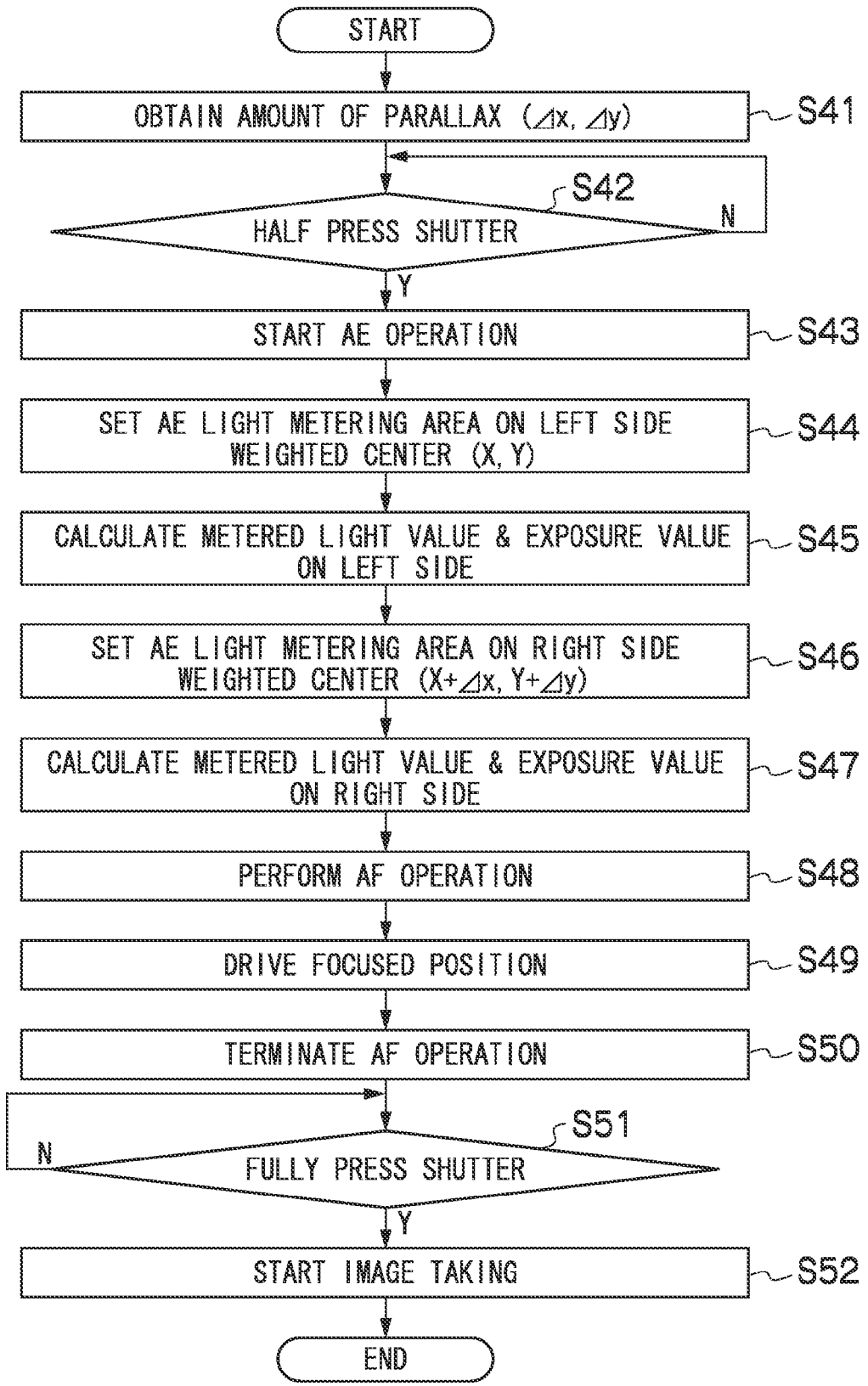
FIG. 15 is a flowchart of the image taking process according to the third embodiment.

Hereinafter, with reference to a flowchart of FIG. 15, a flow of the image taking process according to the preferred third embodiment of the presently disclosed subject matter will be described. Execution of this process is controlled by the CPU 40. A program for causing the CPU 40 to execute this process is stored in the ROM 51. It should be noted that the personal computer or the like having the hardware configuration equivalent to the CPU 40 can also control the execution of the following process, and thus, the CPU 40 does not necessarily need to be included in the camera 2.

S41 to 42 are similar to S1 to 2, respectively. In S41, the final parallax vector (Δx, Δy) is defined.

In S43, in response to the definition of the final parallax vector (Δx,Δy), the following AE process is started.

Figure 16:
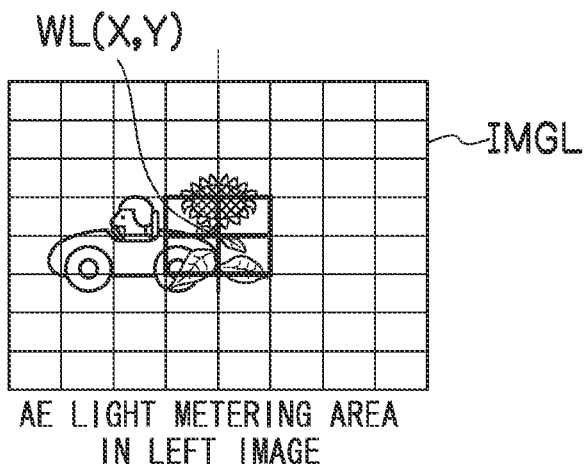
FIG. 16 is a diagram illustrating an example of weighted center coordinates (X, Y) and small regions of the second image data.

In S44, the AE/AWB detection unit 73 is controlled to set weighted center coordinates WL (X, Y), in the second image data IMGL obtained by the imaging in response to the half pressing of the shutter button 6 (see FIG. 16). The AE/AWB detection unit 73 divides one screen of the second image data into a predetermined number (for example, 8×8=64) of the small regions, and decides the weight of each small region depending on the set weighted center coordinates WL (X, Y). While the center coordinates WL (X, Y) have been previously set and saved in the ROM 51, the center coordinates WL (X, Y) may be able to be changed according to the instruction from the CPU 40 or the operation unit 10.

Figure 17:
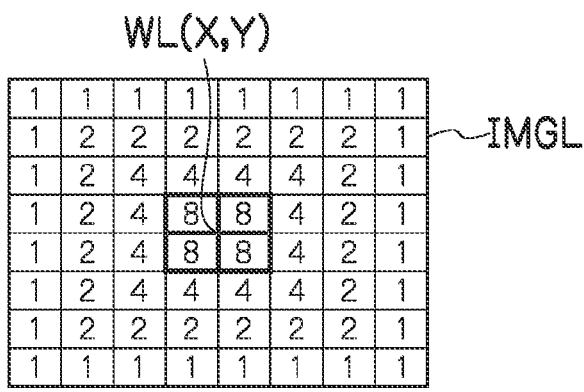
FIG. 17 is a diagram illustrating an example of a weight of each small region of the second image data.

FIG. 17 illustrates an example of the weight of each small region of the second image data IMGL, which is decided by the AE/AWB detection unit 73. A highest weight "8" is given to the small regions around the weighted center coordinates WL (X, Y), and a smaller weight "4", "2" or "1" is given to the small regions which are further away from the center. As illustrated in FIG. 17, if (X,Y) is at the center of the screen, the metering is so-called center-weighted average metering. In other words, in consideration of a fact that a main subject is often positioned near the center of a screen of a taken image, weight coefficients near the center of the screen of the taken image are set to be large. It should be noted that values of the weights are not limited to the values illustrated in the figure, and the values may be set as appropriate.

In S45, the AE/AWB detection unit 73 detects the subject luminance for each small region, assigns the corresponding weight to the subject luminance for each small region, performs an exposure operation process, and calculates the second metered light value. Then, the exposure control is performed based on the obtained second metered light value. The exposure control can be performed similarly to Japanese Patent Application Laid-Open No. 2008-209760.

Figure 18A:
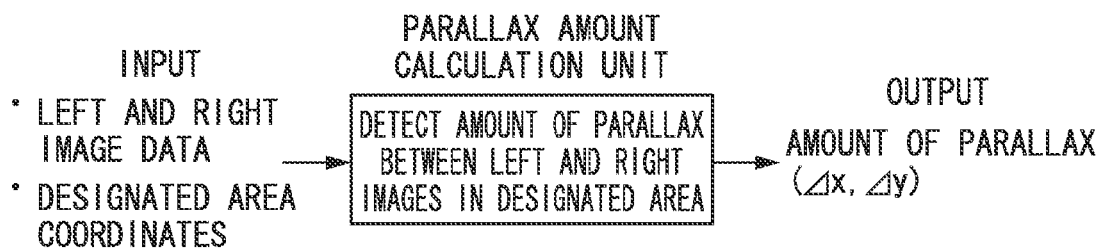
FIGS. 18A and 18B are diagrams schematically illustrating calculation of weighted center coordinates (X+Δx, Y+Δy)
Figure 18B:
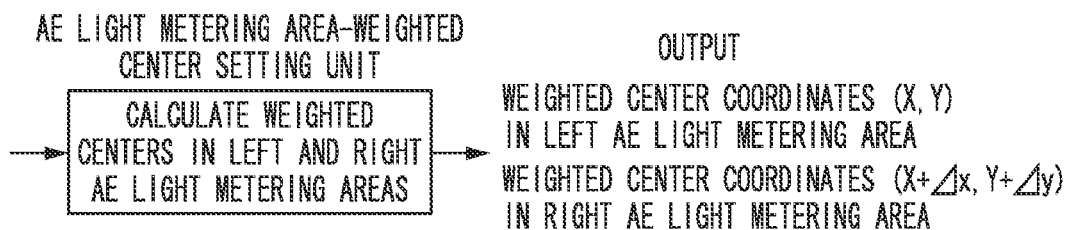
Figure 19:
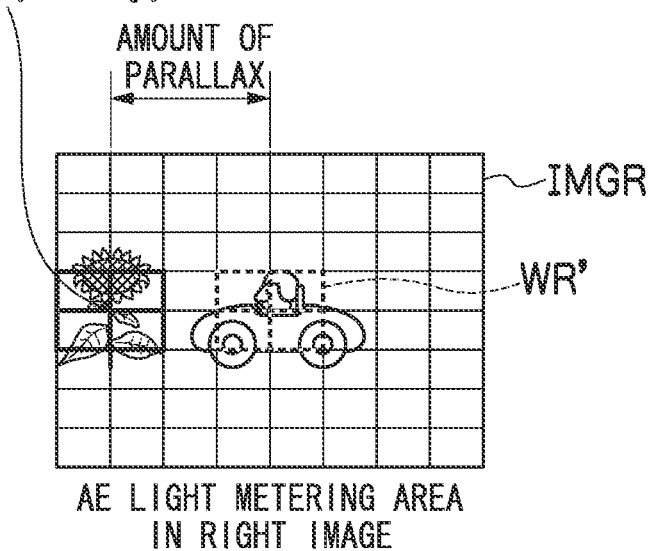
FIG. 19 is a diagram illustrating an example of the weighted center coordinates (X+Δx, Y+Δy) set in the first image data, and small regions of the first image data.

In S46, the AE light metering area-weighted center setting unit 85 is controlled to calculate weighted center coordinates WR (X+Δx, Y+Δy) in the AE evaluation area for the first image data IMGR (see FIGS. 18A and 18B). In FIGS. 18A and 18B, an area WR' is an original (not moved) metering area (weighted center). The AE/AWB detection unit 73 divides one screen of the first image data IMGR into a predetermined number (for example, 8×8=64) of the small regions, and decides the weight of each small region (see FIG. 19) depending on the set weighted center coordinates (X+Δx, Y+Δy).

Figure 20:
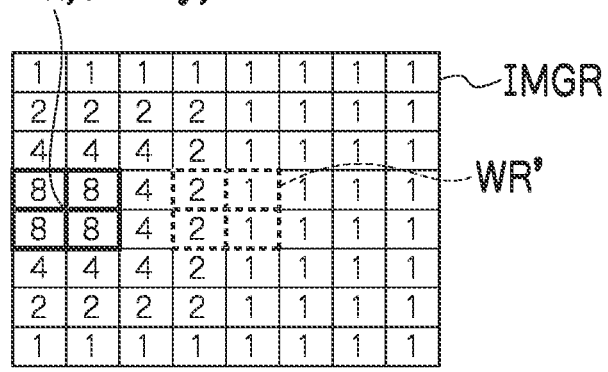
FIG. 20 is a diagram illustrating an example of a weight of each small region of the first image data.

FIG. 20 illustrates an example of the weight of each small region of the first image data IMGR, which is decided by the AE/AWB detection unit 73. The highest weight "8" is given to the small regions around the weighted center coordinates (X+Δx,Y+Δy), and the smaller weight "4", "2" or "1" is given to the small regions which are further away from the center. It should be noted that the values of the weights are not limited to the values illustrated in the figure, and the values may be set as appropriate.

In S47, the AE/AWB detection unit detects the subject luminance for each small region, assigns the corresponding weight to the metered light value (subject luminance) for each small region, performs the exposure operation process, and calculates the first metered light value (exposure value). Then, the exposure control is performed based on the obtained first metered light value. The exposure control can be performed similarly to Japanese Patent Application Laid-Open No. 2008-209760. In other words, an appropriate exposure value is calculated based on an average weight value of the subject luminance for each small region, and the exposure control is performed.

In S48 to S50, the AF process is performed. This AF process is preferably the AF process described in S4 to S10 of the first embodiment, which, however, may be a conventional AF process.

S51 to S52 are similar to S11 to S12, respectively.

According to the above process, a right AE light metering area is shifted by the amount of parallax with reference to the weighted center coordinates in a left AE light metering area, and thereby, the parallax between the weighted center coordinates of the AE light metering areas of the imaging systems can be eliminated, the differences in the metered light value and in the exposure level can be prevented, and the stereoscopic image in the stable state where the image is easily viewable and the viewer does not get tired easily, can be provided to the viewer.

<Fourth Embodiment>

Setting similar to the setting of the center coordinates for the AF evaluation area and the AE light metering area can also be performed for a flash light adjustment area. The flash light adjustment area is an area from which an appropriate light emission amount is decided by comparing luminances between two images obtained by exposure without the light emission of the flash 5 and by exposure with the light emission.

Figure 21:
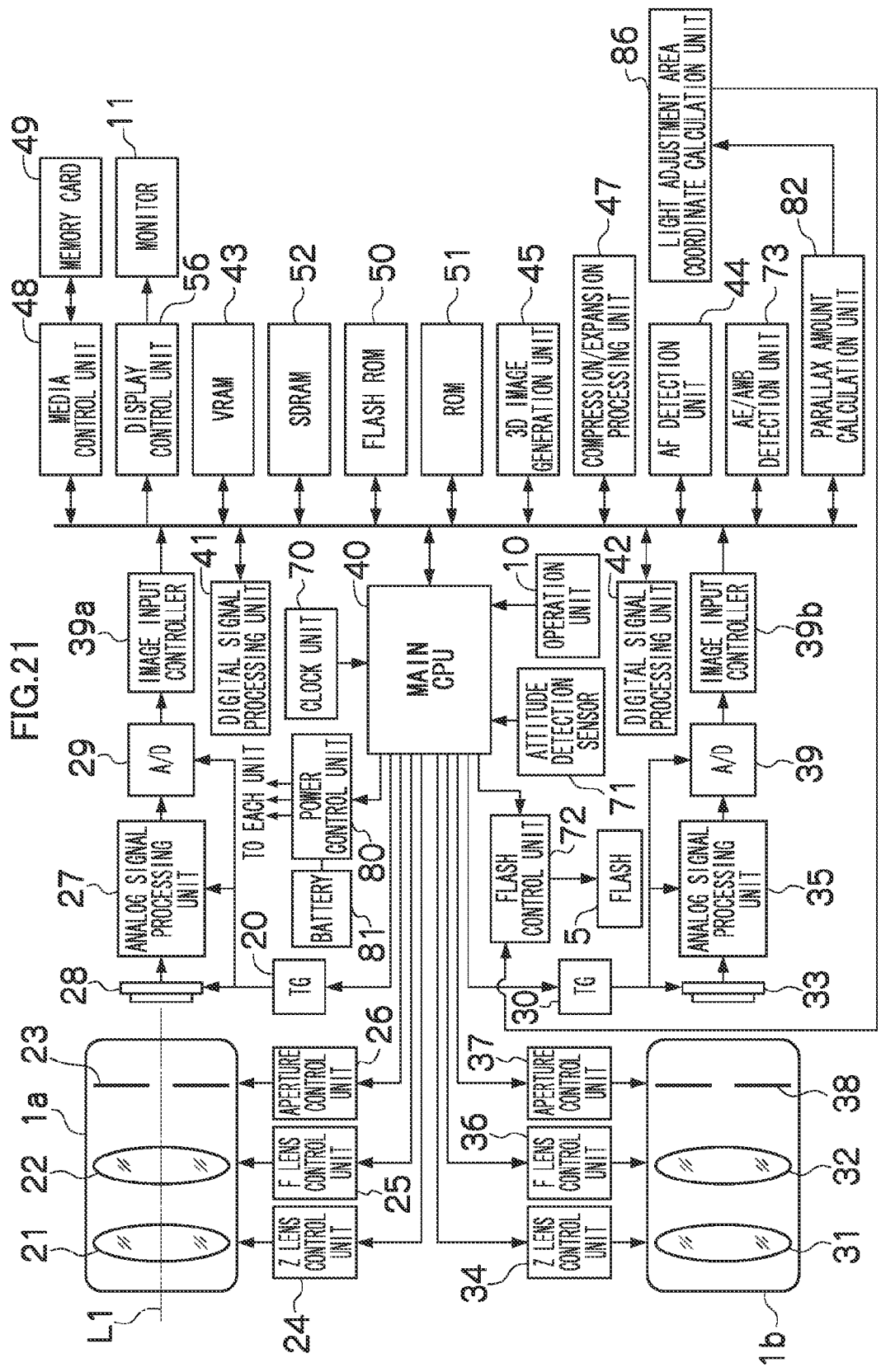
FIG. 21 is a block diagram of the camera according to a fourth embodiment.

FIG. 21 illustrates the electrical configuration of the camera 2 according to a fourth embodiment. The same blocks as those of the above described embodiments are assigned with the same reference numerals. This camera 2 has a light adjustment area coordinate calculation unit 86.

Figure 22:
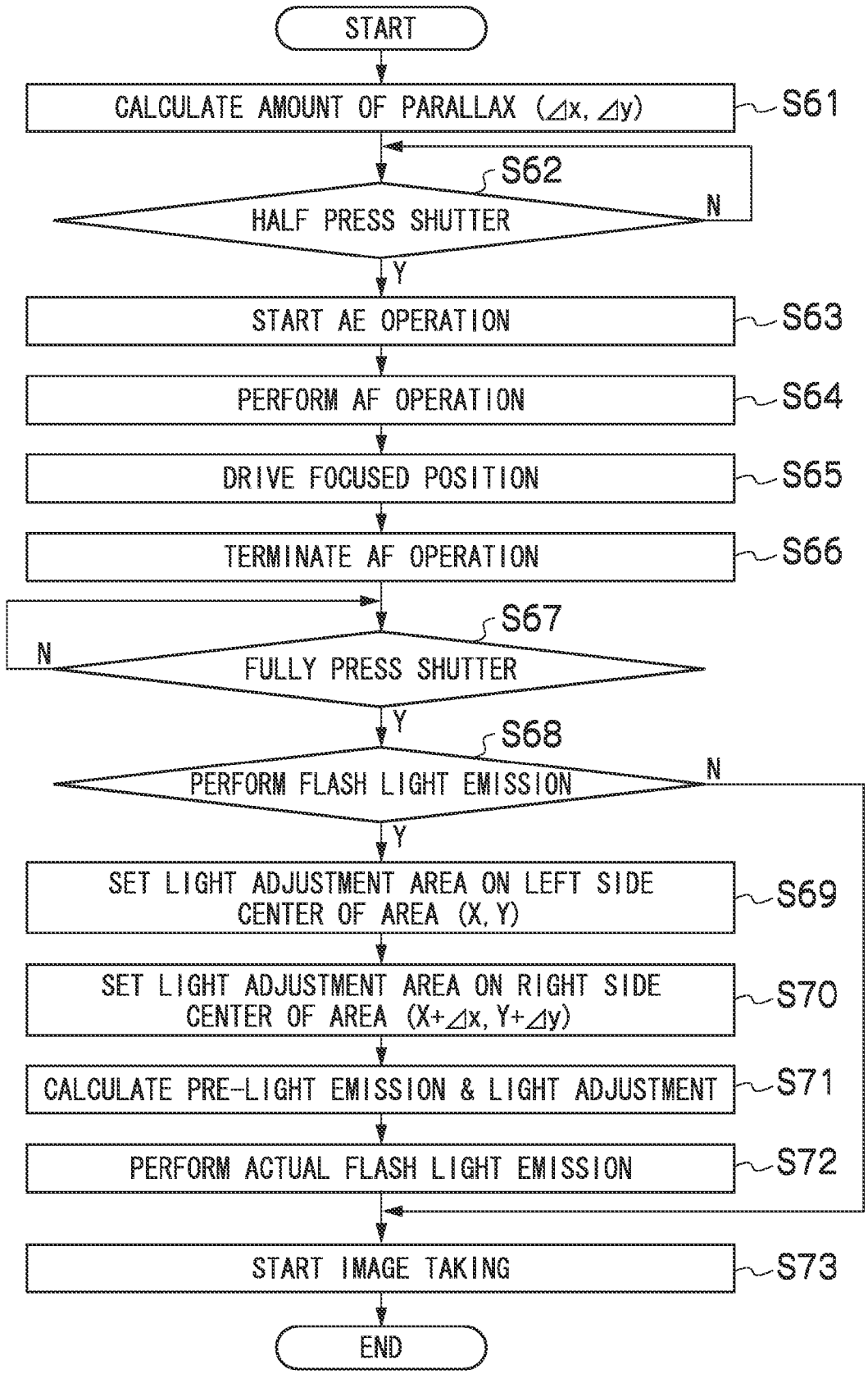
FIG. 22 is a flowchart of the image taking process according to the fourth embodiment.

FIG. 22 illustrates a flowchart of the image taking process executed by the camera 2 according to the fourth embodiment.

S61 to S62 are similar to S1 to S2, respectively. Moreover, S63 may be similar to the second or third embodiment, or may be a normal AE process. Moreover, S64 to S66 may be similar to the first embodiment, or may be a normal AF process. S67 is similar to S11.

In S68, it is determined whether or not the flash light emission has been previously set from the operation unit 10 or the like. If the flash light emission has been set, the process proceeds to S69, and if the flash light emission has not yet been set, the process proceeds to S73. This setting of the flash light emission may be automatic or manual.

Figure 23A:
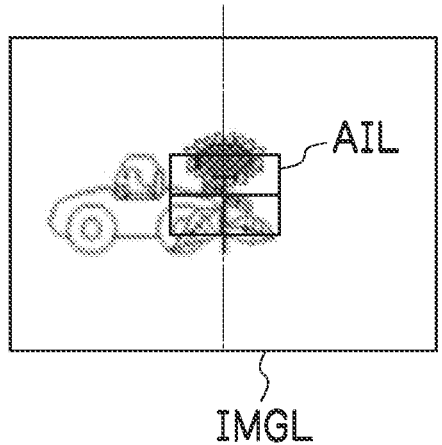
FIGS. 23A and 23B are diagrams illustrating an example of a flash light adjustment area.

In S69, the flash control unit 72 is controlled to set a light adjustment area AIL (see FIG. 23A) of a predetermined shape and a predetermined size, which has the center coordinates (X, Y), in the image data, that is, the second image data IMGL, which is obtained by the imaging by the reference imaging unit, here, the second image taking optical system 1b, in response to the full pressing of the shutter button. While the center coordinates (X,Y) have been previously set and saved in the ROM 51, the center coordinates (X,Y) may be able to be changed according to the instruction from the CPU 40 or the operation unit 10.

Figure 23B:
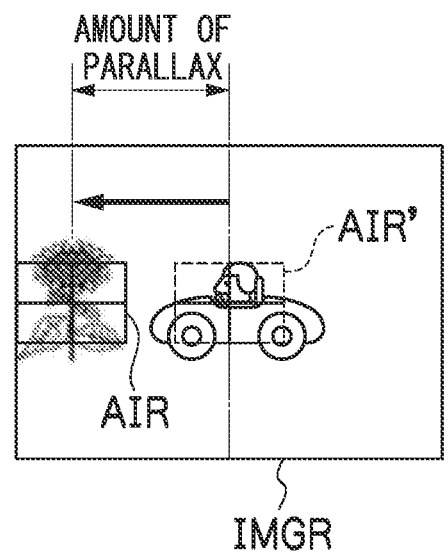
Figure 24:
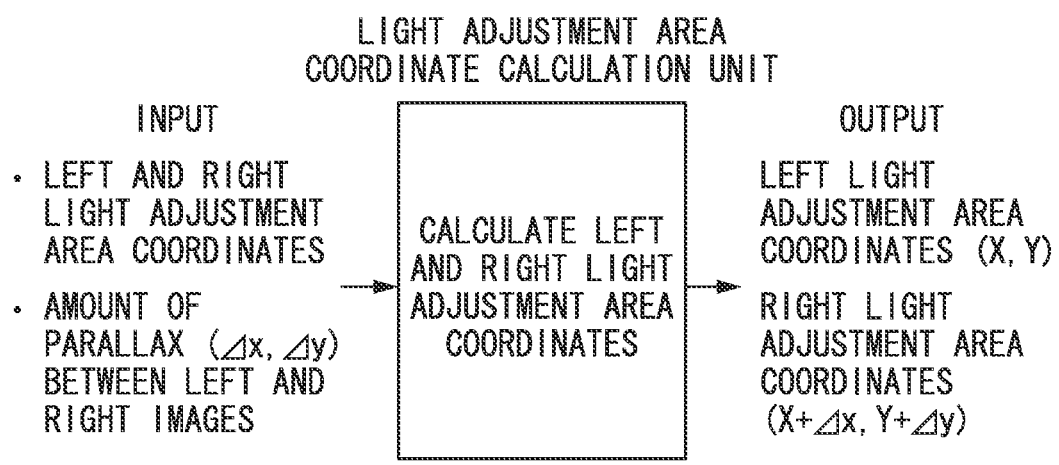
FIG. 24 is a diagram schematically illustrating the calculation of the center coordinates (X+Δx, Y+Δy) in the spot metering area.

In S70, the CPU 40 controls the light adjustment area coordinate calculation unit 86 to calculate center coordinates $(X+\Delta x, Y+\Delta y)$ in the flash light adjustment area AIR for the first image data IMGR, from the final parallax vector $(\Delta x, \Delta y)$ calculated as the above described embodiment (see FIG. 24). Then, the CPU 40 controls the flash control unit 72 to set a light adjustment area AIR (see FIG. 23B) of a predetermined shape and a predetermined size, which has the calculated center coordinates $(X+\Delta x, Y+\Delta y)$, in the image data, that is, the first image data IMGR, which is obtained by the imaging by the adjustment target imaging unit, here, the first image taking optical system 1a, in response to the full pressing of the shutter button. In FIG. 23B, an area AIR' is an original (not moved) flash light adjustment area.

In S71, the CPU 40 performs the imaging twice in each of the first image taking optical system 1a and the second image taking optical system 1b, corresponding to exposure without preliminary light emission of the flash 5 and exposure with the preliminary light emission. Then, the CPU 40 controls the flash control unit 72 to set the light adjustment areas of the predetermined shape and the predetermined size, which have the center coordinates $(X+\Delta x, Y+\Delta y)$ and $(X, Y)$, in respective two pieces of the first image data and two pieces of the second image data, which have been obtained in a non-light emission state and in a light emission state as described above, respectively.

The CPU 40 calculates a difference value between the luminances in the corresponding light adjustment areas in the obtained two pieces of the first image data (for example, as illustrated in FIG. 23B, divided regions obtained by equally dividing the image central portion into 2×2) and an average value, and calculates a difference value between the luminances in the corresponding light adjustment areas in the two pieces of the second image data IMGL (for example, FIG. 23A) and an average value.

The CPU 40 calculates a light emission amount of the flash at the time of actual image taking, based on the two difference values corresponding to the first image taking optical system 1a and the second image taking optical system 1b, respectively. A publicly known calculation method can be employed. For example, the CPU 40 calculates a light emission magnification and a light emission time for the flash light emission amount with respect to the preliminary light emission, from an average (or an average weight) of the above two difference values.

In S72, the CPU 40 controls the flash control unit 72 to perform the light emission of the flash 5 for the light emission time, when the imaging of the first and second image data to be recorded is performed in response to the full pressing of the shutter button.

In S73, the CPU 40 performs the imaging of the first and second image data to be recorded, in synchronization with the light emission of the flash 5. The obtained image data is stored in the memory card 49.

According to the above process, a right light adjustment area is shifted by the amount of parallax with reference to the center coordinates in a left light adjustment area, and thereby, the parallax between the center coordinates in the light adjustment areas of the imaging systems can be eliminated, difference in a light adjustment level can be prevented, and the stereoscopic image in the stable state where the image is easily viewable and the viewer does not get tired easily, can be provided to the viewer.

<Fifth Embodiment>

Setting similar to the setting of the weighted center coordinates for the AE light metering area can also be performed for the flash light adjustment area.

Figure 25:
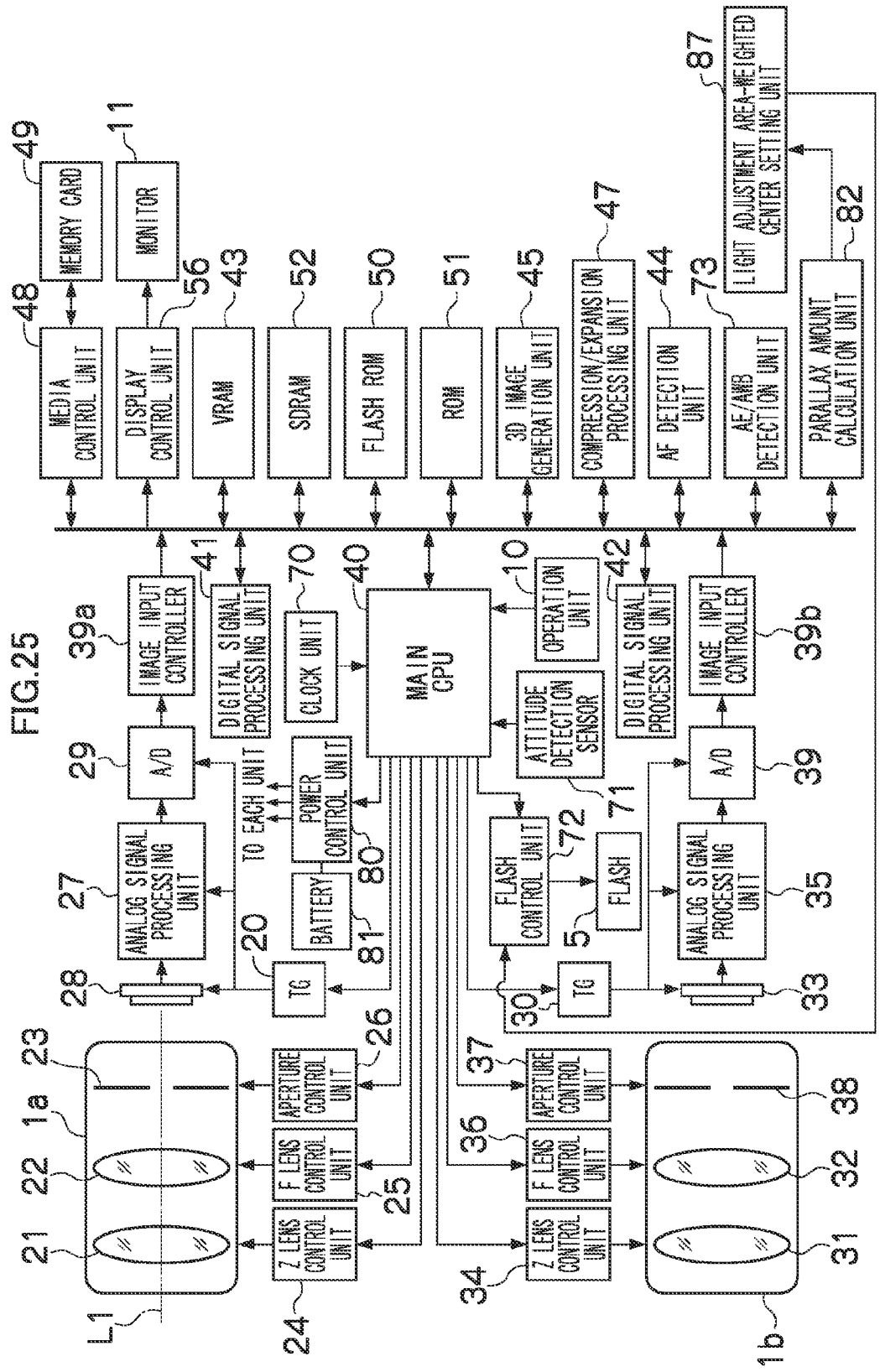
FIG. 25 is a block diagram of the camera according to a fifth embodiment.

FIG. 25 illustrates the electrical configuration of the camera 2 according to a fifth embodiment. The same blocks as those of the above described embodiments are assigned with the same reference numerals. This camera 2 has a light adjustment area-weighted center setting unit 87.

Figure 26:
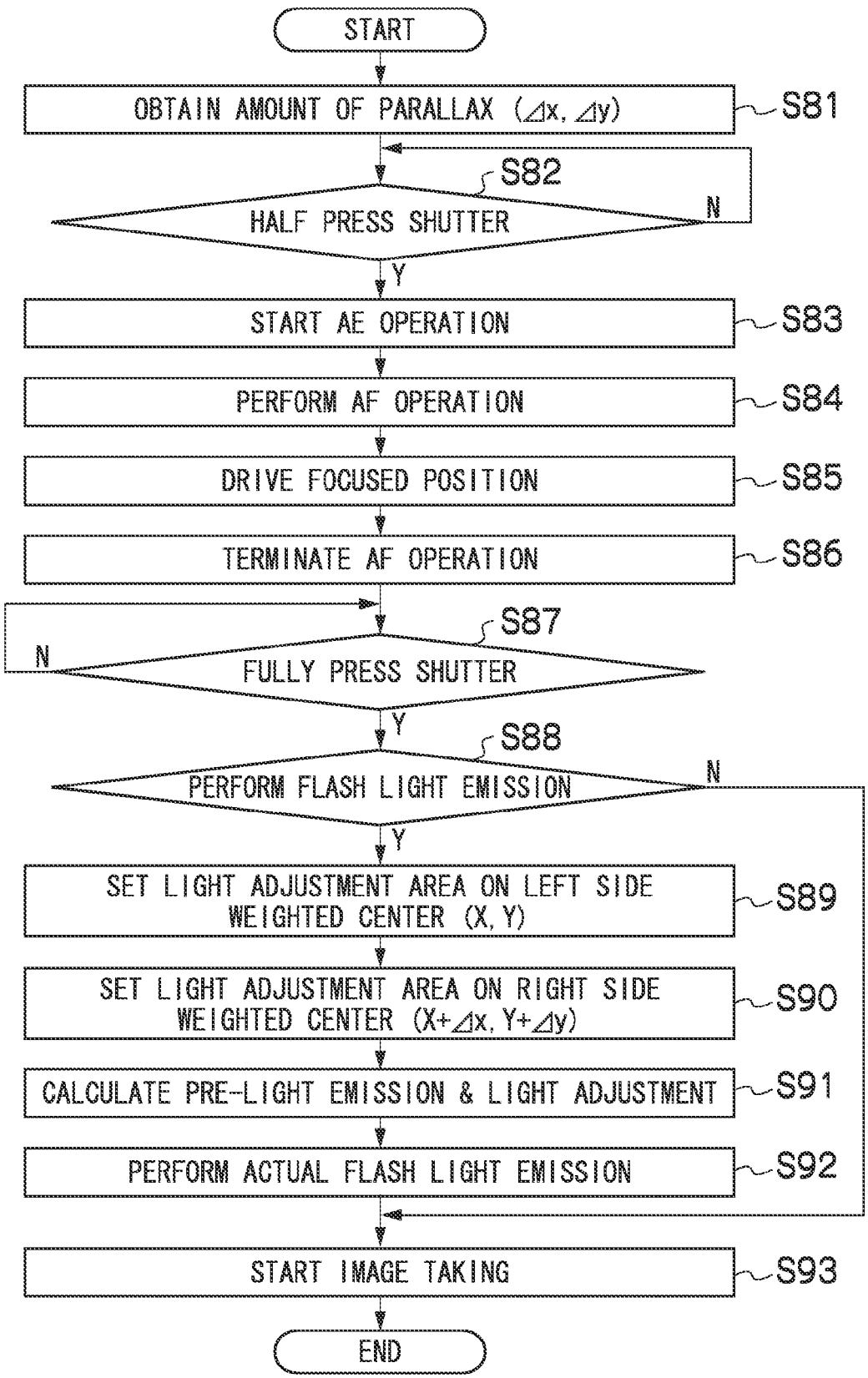
FIG. 26 is a flowchart of the image taking process according to the fifth embodiment.

FIG. 26 illustrates a flowchart of the image taking process executed by the camera 2 according to the fifth embodiment.

S81 to S93 are similar to S61 to S73, respectively, except S89 to S92.

Figure 27:
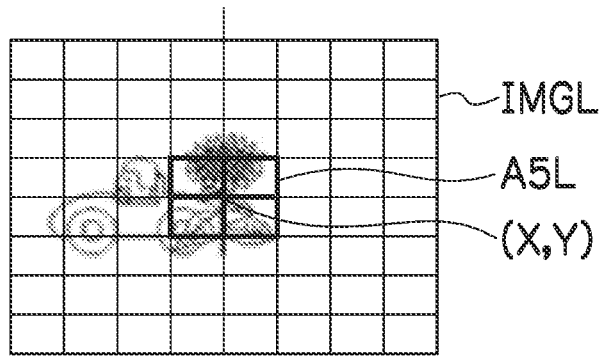
FIG. 27 is a diagram illustrating an example of the weighted center coordinates (X, Y) and the small regions of the second image data.

In S89, the light adjustment area-weighted center setting unit 87 is controlled to set the weighted center coordinates (X, Y) in the second image data IMGL obtained by the imaging in response to the full pressing of the shutter button (see FIG. 27). The light adjustment area-weighted center setting unit 87 divides one screen of the second image data into the predetermined number (for example, 8×8=64) of the small regions, and decides the weight of each small region depending on the set weighted center coordinates (X, Y). While the center coordinates (X, Y) have been previously set and saved in the ROM 51, the center coordinates (X, Y) may be able to be changed according to the instruction from the CPU 40 or the operation unit 10.

Figure 28:
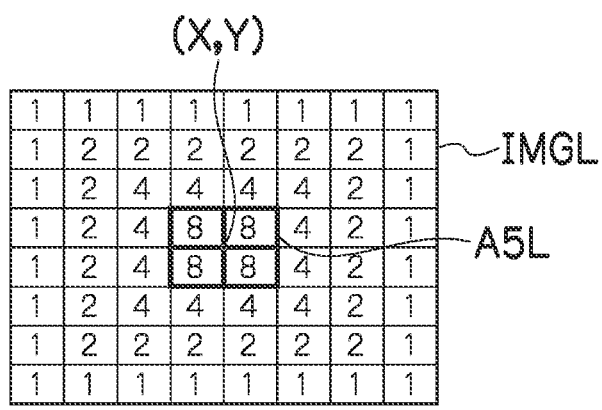
FIG. 28 is a diagram illustrating an example of the weight of each small region of the second image data.

FIG. 28 illustrates an example of the weight of each small region of the second image data, which is decided by the light adjustment area-weighted center setting unit 87. The highest weight "8" is given to the small regions A5L around the weighted center coordinates (X, Y), and the smaller weight "4", "2" or "1" is given to the small regions which are further away from the center. As illustrated in FIG. 28, if (X, Y) is at the center of the screen, the light adjustment is the light adjustment with an emphasis on the central portion. In other words, in consideration of the fact that the main subject is often positioned near the center of the screen of the taken image, the weight coefficients near the center of the screen of the taken image are set to be large. It should be noted that the values of the weights are not limited to the values illustrated in the figure, and the values may be set as appropriate.

Figure 29:
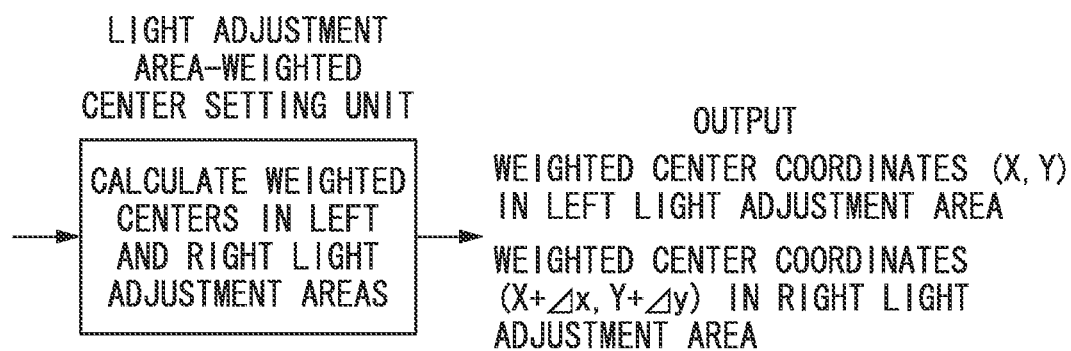
FIG. 29 is a diagram schematically illustrating the calculation of the weighted center coordinates (X+Δx, Y+Δy)

In S90, the light adjustment area-weighted center setting unit 87 is controlled to calculate the weighted center coordinates (X+Δx, Y+Δy) in the AE evaluation area for the first image data (see FIG. 29). The light adjustment area-weighted center setting unit 87 divides one screen of the first image data IMGR into the predetermined number (for example, 8×8=64) of the small regions, and decides the weight of each small region (see FIG. 30) depending on the set weighted center coordinates (X+Δx, Y+Δy).

Figure 30:
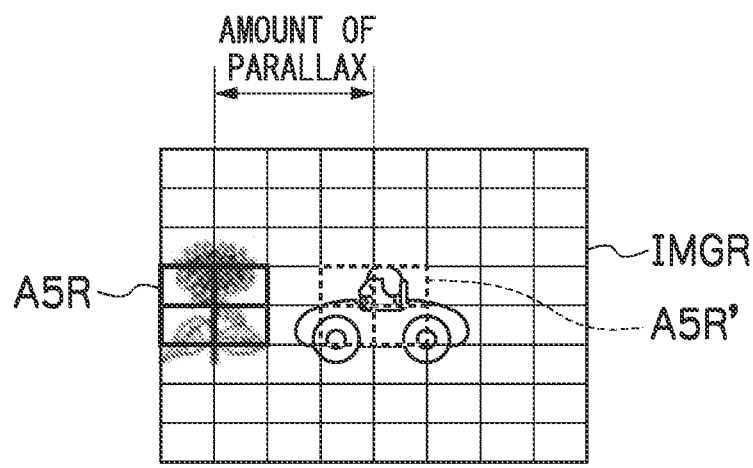
FIG. 30 is a diagram illustrating an example of the weighted center coordinates (X+Δx, Y+Δy) set in the first image data, and the small regions of the first image data.
Figure 31:
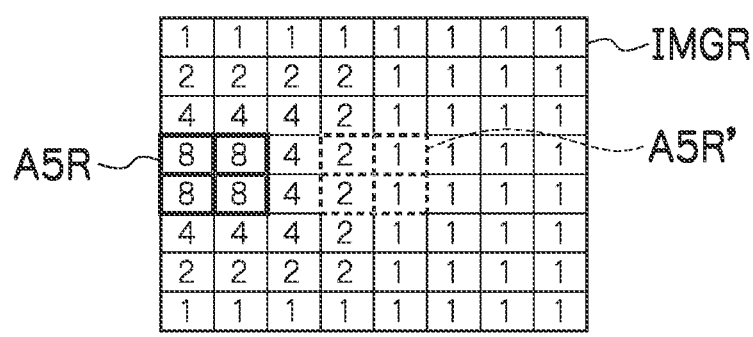
FIG. 31 is a diagram illustrating an example of the weight of each small region of the first image data.

FIG. 31 illustrates an example of the weight of each small region of the first image data IMGR, which is decided by the light adjustment area-weighted center setting unit 87. The highest weight "8" is given to the small regions A5R around the weighted center coordinates (X+Δx, Y+Δy), and the smaller weight "4", "2" or "1" is given to the small regions which are further away from the center. It should be noted that the values of the weights are not limited to the values illustrated in the figure, and the values may be set as appropriate. In FIGS. 30 and 31, an area A5R' is an original area around a (not moved) weighted center (X, Y).

In S91, the CPU 40 performs the imaging twice in each of the first image taking optical system 1a and the second image taking optical system 1b, corresponding to the exposure without the preliminary light emission of the flash 5 and the exposure with the preliminary light emission. Then, the CPU 40 controls the flash control unit 72 to set the light adjustment areas of the predetermined shape and the predetermined size, which have the weighted center coordinates (X+Δx, Y+Δy) and (X, Y), in respective two pieces of the first image data and two pieces of the second image data, which have been obtained in the non-light emission state and in the light emission state as described above, respectively.

The CPU 40 calculates a difference value between the average weight values of the luminances in the corresponding light adjustment areas in the obtained two pieces of the first image data, and calculates a difference value between the average weight values of the luminances in the corresponding light adjustment areas in the two pieces of the second image data. The CPU 40 calculates the light emission amount of the flash at the time of the actual image taking, based on the two difference values corresponding to the first image taking optical system 1a and the second image taking optical system 1b, respectively. A publicly known calculation method can be employed. For example, the CPU 40 calculates the light emission magnification and the light emission time for the flash light emission amount with respect to the preliminary light emission, from the average (or the average weight) of the above two difference values.

In S92, the CPU 40 controls the flash control unit 72 to perform the light emission of the flash 5 for the light emission time, when the imaging of the first and second image data to be recorded is performed in response to the full pressing of the shutter button.

According to the above process, the right light adjustment area is shifted by the amount of parallax with reference to the weighted center coordinates in the left light adjustment area, and thereby, the parallax between the weighted center coordinates in the light adjustment areas of the imaging systems can be eliminated, the difference in the light adjustment level can be prevented, and the stereoscopic image in the stable state where the image is easily viewable and the viewer does not get tired easily, can be provided to the viewer.

The presently disclosed subject matter can be provided as a computer-readable program code for causing a device (such as a stereoscopic camera, an electronic camera, a plurality of electronic cameras connected to each other, or a computer including or connected to a electronic camera) to execute the above described process, a computer-readable recording medium on which the computer-readable program code is stored or a computer program product including the computer-readable program code.

What is claimed is:

1. An imaging device comprising:
   an imaging unit configured to photoelectrically convert subject images formed via a first optical system and a second optical system respectively, by an imaging element, and output a first viewpoint image and a second viewpoint image;
   a setting unit configured to set coordinates of the center of an automatic focusing (AF) evaluation value calculation region of the first viewpoint image, said AF evaluation value calculation region being used for automatic focusing for said first viewpoint image;
   a parallax amount calculation unit configured to calculate an amount of parallax of corresponding subjects between the first viewpoint image and the second viewpoint image based on a parallax vector connecting
      a point associated with a subject in the first viewpoint image, the point being detected in the AF evaluation value calculation region of the first viewpoint image whose coordinates of the center have been set by the setting unit and
      a corresponding point associated with a corresponding subject in the second viewpoint image, wherein said corresponding point in the second viewpoint image corresponds to the point in the first viewpoint image;
   a determination unit configured to determine coordinates of the center of an automatic focusing (AF) evaluation value calculation region of the second viewpoint image, based on
      the coordinates of the center of the AF evaluation value calculation region of the first viewpoint image set by the setting unit and
      the amount of parallax calculated by the parallax amount calculation unit, said AF evaluation value calculation region of the second viewpoint image being used for automatic focusing for said second viewpoint image; and
   a control unit configured to
      adjust an imaging condition of the first optical system based on image data in the AF evaluation value calculation region of the first viewpoint image, for focusing said first viewpoint image,
      adjust an imaging condition of the second optical system based on image data in the AF evaluation value calculation region of the second viewpoint image, for focusing said second viewpoint image, and control the imaging unit to output the first viewpoint image and the second viewpoint image under the respective adjusted imaging conditions for the first and second optical systems.

2. The imaging device according to claim 1, wherein the imaging condition evaluation region includes a focus evaluation value calculation region.

3. The imaging device according to claim 2, further comprising:
   a reference optical system-focus control unit, while changing a focus position of the reference optical system, configured to detect a focused position at which a contrast in the focus evaluation value calculation region located at the coordinates set by the setting unit becomes a local maximum, in the first viewpoint image outputted by the reference optical system, and to move the focus position of the reference optical system to the detected focused position; and
   an adjustment target optical system-focus control unit, while changing a focus position of the adjustment target optical system, configured to detect a focused position at which a contrast in the focus evaluation value calculation region located at the coordinates calculated by the calculation unit becomes a local maximum, in the second viewpoint image outputted by the adjustment target optical system, and to move the focus position of the adjustment target optical system to the detected focused position.

4. The imaging device according to claim 1, wherein the imaging condition evaluation region includes a subject luminance calculation region.

5. The imaging device according to claim 4, further comprising:
   a reference optical system-exposure control unit configured to control an exposure of the reference optical system so that a subject luminance detected from the subject luminance calculation region located at the coordinates set by the setting unit becomes appropriate, in the first viewpoint image outputted by the reference optical system; and
   an adjustment target optical system-exposure control unit configured to control an exposure of the adjustment target optical system so that a subject luminance detected from the subject luminance calculation region located at the coordinates calculated by the calculation unit becomes appropriate, in the second viewpoint image outputted by the adjustment target optical system.

6. The imaging device according to claim 4, further comprising:
   a reference optical system-exposure control unit configured to control an exposure of the reference optical system so that an average weight of subject luminances detected from respective divided regions of the subject luminance calculation region including a plurality of the divided regions which are weighted with the coordinates set by the setting unit at the center, becomes appropriate, in the first viewpoint image outputted by the reference optical system; and
   an adjustment target optical system-exposure control unit configured to control an exposure of the adjustment target optical system so that an average weight of subject luminances detected from respective divided regions of the subject luminance calculation region including a plurality of the divided regions which are weighted with the coordinates calculated by the calculation unit at the center, becomes appropriate, in the second viewpoint image outputted by the adjustment target optical system.

7. The imaging device according to claim 1, wherein the imaging condition evaluation region includes a light adjustment-luminance calculation region.

8. The imaging device according to claim 1, wherein the parallax amount calculation unit calculates the amount of parallax between the reference optical system and the adjustment target optical system, based on a parallax vector connecting a feature point detected from the imaging condition evaluation region whose coordinates have been set by the setting unit and which corresponds to the reference optical system, and a corresponding point corresponding to the feature point in the viewpoint image from the adjustment target optical system.

9. The imaging device according to claim 8, wherein the parallax amount calculation unit configured to calculate the parallax amount based on the average value of a plurality of parallax vectors for subjects with different distances, the mode value of the plurality of the parallax vectors, the longest parallax vector among the plurality of the parallax vectors, or the nearest parallax vector to the imaging device among the plurality of the parallax vectors.

10. The imaging device according to claim 9, wherein the center of the AF evaluation value calculation region of the first viewpoint image is the center of a subject detected as a specific type of a subject.

11. The imaging device according to claim 1, wherein the parallax amount calculation unit calculates the amount of parallax depending on at least one of a cross-point adjustment amount, an automatic parallax adjustment amount and a manual parallax adjustment amount.

12. The imaging device according to claim 1, further comprising a stereoscopic image output unit configured to output a stereoscopic image based on the left and right viewpoint images outputted by the imaging unit.

13. An imaging method in which an imaging device comprising an imaging unit configured to photoelectrically convert subject images formed via a first optical system and a second optical system respectively, by an imaging element, and output a first viewpoint image and a second viewpoint image, executes the steps of:
   setting coordinates of the center of an automatic focusing (AF) evaluation value calculation region of the first viewpoint image, said AF evaluation value calculation region being used for automatic focusing for said first viewpoint image;
   calculating an amount of parallax of corresponding subjects between the first viewpoint image and the second viewpoint image based on a parallax vector connecting
      a point associated with a subject in the first viewpoint image, the point being detected in the AF evaluation value calculation region of the first viewpoint image whose coordinates of the center have been set by the setting unit and
      a corresponding point associated with a corresponding subject in the second viewpoint image, wherein said corresponding point in the second viewpoint image corresponds to the point in the first viewpoint image;
   determining coordinates of the center of an automatic focusing (AF) evaluation value calculation region of the second viewpoint image, based on
      the coordinates of the center of the AF evaluation value calculation region of the first viewpoint image and
      the calculated amount of parallax, said AF evaluation value calculation region of the second viewpoint image being used for automatic focusing for said second viewpoint image; and adjusting an imaging condition of the first optical system based on image data in the AF evaluation value calculation region of the first viewpoint image, for focusing said first viewpoint image, adjusting an imaging condition of the second optical system based on image data in the AF evaluation value calculation region of the second viewpoint image, for focusing said second viewpoint image, and controlling the imaging unit to output the first viewpoint image and the second viewpoint image under the respective adjusted imaging conditions for the first and second optical systems.

14. A non-transitory computer-readable recording medium including instructions stored thereon, such that when the instructions are read and executed by a processor, the processor is configured to perform the steps of:
   setting coordinates of the center of an automatic focusing (AF) evaluation value calculation region of the first viewpoint image, said AF evaluation value calculation region being used for automatic focusing for said first viewpoint image;
   calculating an amount of parallax of corresponding subjects between a first viewpoint image outputted by a first optical system and a second viewpoint image outputted by a second optical system, based on a parallax vector connecting
      a point associated with a subject in the first viewpoint image, the point being detected in the AF evaluation value calculation region of the first viewpoint image whose coordinates of the center have been set by the setting unit and
      a corresponding point associated with a corresponding subject in the second viewpoint image, wherein said corresponding point in the second viewpoint image corresponds to the point in the first viewpoint image;
   determining coordinates of the center of an AF evaluation value calculation region of the second viewpoint image, based on
      the coordinates of the center of the AF evaluation value calculation region of the first viewpoint image, and
      the calculated amount of parallax, said AF evaluation value calculation region of the second viewpoint image being used for automatic focusing for said second viewpoint image; and
   adjusting an imaging condition of the first optical system based on image data in the AF evaluation value calculation region of the first viewpoint image, for focusing said first viewpoint image, adjusting an imaging condition of the second optical system based on image data in the AF evaluation value calculation region of the second viewpoint image, for focusing said second viewpoint image, and outputting the first viewpoint image and the second viewpoint image under the respective adjusted imaging conditions for the first and second optical systems.

* * * * *